US 8,509,248 B2

(12) United States Patent
Mehta et al.

(10) Patent No.: US 8,509,248 B2
(45) Date of Patent: *Aug. 13, 2013

(54) ROUTING FRAMES IN A COMPUTER NETWORK USING BRIDGE IDENTIFIERS

(75) Inventors: Apurva Mehta, Cupertino, CA (US); Ramasamy Ramanathan, Santa Clara, CA (US); Kumar Mehta, Cupertino, CA (US); Ramanarayanan Ramakrishnan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 743 days.

This patent is subject to a terminal disclaimer.

(21) Appl. No.: 12/344,644

(22) Filed: Dec. 29, 2008

(65) Prior Publication Data

US 2010/0165995 A1  Jul. 1, 2010

(51) Int. Cl.
*H04L 12/28* (2006.01)
*H04J 3/16* (2006.01)

(52) U.S. Cl.
USPC ........... 370/401; 370/389; 370/392; 370/466; 370/467

(58) Field of Classification Search
None
See application file for complete search history.

(56) References Cited

U.S. PATENT DOCUMENTS

| 6,275,492 | B1 | 8/2001 | Zhang |
| 7,688,756 | B2 | 3/2010 | Allan et al. |
| 7,787,480 | B1 | 8/2010 | Mehta et al. |
| 7,860,031 | B2 * | 12/2010 | Sasagawa et al. ............. 370/256 |
| 2003/0161309 | A1 | 8/2003 | Karuppiah |
| 2004/0047353 | A1 * | 3/2004 | Umayabashi et al. ... 370/395.63 |
| 2007/0086361 | A1 | 4/2007 | Allan et al. |
| 2007/0165657 | A1 | 7/2007 | Smith et al. |
| 2007/0258446 | A1 | 11/2007 | Smith et al. |
| 2008/0089326 | A1 | 4/2008 | Kotrla et al. |
| 2008/0279196 | A1 | 11/2008 | Friskney et al. |
| 2009/0073997 | A1 * | 3/2009 | Teng ............................. 370/401 |

(Continued)

FOREIGN PATENT DOCUMENTS

| EP | 1705840 A1 | 9/2006 |
| EP | 1 858 212 A1 | 11/2007 |

(Continued)

OTHER PUBLICATIONS

Perlman et al., "Rbridges: Base Protocol Specification", IEFT, Nov. 2 2008.*

(Continued)

*Primary Examiner* — Faruk Hamza
*Assistant Examiner* — Thinh Tran
(74) *Attorney, Agent, or Firm* — Shumaker & Sieffert, P.A.

(57) ABSTRACT

Methods, apparatus, and products for routing frames in a network using bridge identifiers, wherein the network includes a plurality of bridge nodes. At least one of the bridge nodes operates as an ingress bridge node through which frames are received into the network. At least one of the bridge nodes operates as an egress bridge node through which frames are transmitted out of the network. One of the bridge nodes receives, from the ingress bridge node, a frame for transmission to a destination node. The destination node connects to the network through the egress bridge node. The frame includes an ingress bridge identifier and an egress bridge identifier. The bridge that received the frame then routes the frame to the egress bridge node through which the destination node connects to the network in dependence upon the ingress bridge identifier and the egress bridge identifier included in the frame.

26 Claims, 13 Drawing Sheets

(56) References Cited

U.S. PATENT DOCUMENTS

| | | |
|---|---|---|
| 2009/0161669 A1 | 6/2009 | Bragg et al. |
| 2009/0323706 A1 | 12/2009 | Germain et al. |
| 2010/0080238 A1 | 4/2010 | Allan et al. |
| 2010/0284418 A1 | 11/2010 | Gray et al. |
| 2010/0309912 A1 | 12/2010 | Mehta et al. |
| 2010/0322254 A1 | 12/2010 | Takacs |
| 2011/0019678 A1 | 1/2011 | Mehta et al. |
| 2011/0032936 A1 | 2/2011 | Ashwood-Smith et al. |

FOREIGN PATENT DOCUMENTS

| | | |
|---|---|---|
| EP | 2 001 172 A2 | 12/2008 |
| JP | 2001-197114 | 7/2001 |
| JP | 2003-273911 | 9/2003 |
| JP | 2003-324462 | 11/2003 |
| WO | WO 2008/076052 | 6/2008 |
| WO | WO 2010/111142 | 9/2010 |

OTHER PUBLICATIONS

Interworking Task Group of IEEE, "IEEE P802.1ah/D4.2—Virtual Bridged Local Area Networks—Amendment 6: Provider Backbone Bridges", Mar. 26, 2008.

IEEE Computer Society, "IEEE Std. 802.1D—2004, IEEE Standard for Local and metropolitan area networks Media Access Control (MAC) Bridges", Jun. 9, 2004.

IEEE Computer Society, "IEEE Std. 802.1ad—2005, IEEE Standard for Local and metropolitan area networks Virtual Bridged Local Area Networks, Amendment 4: Provider Bridges", May 26, 2006.

IEEE Computer Society, "IEEE Std. 802.1Q—2005, IEEE Standard for Local and metropolitan area networks Virtual Bridged Local Area Networks", May 19, 2006.

Communication Pursuant to Article 94(3) EPC for corresponding European Application No. 09252095.6, dated Apr. 7, 2011, 6 pgs.

D. Fedyk et al., "802.Iaq Shortest Path Bridging May Recap", IEEE, http://www.ieee802.org/1/files/public/docs2009/aq-fedyk-SPB-recap_0509_v1.pdf, May 18, 2009, entire document, 36 pp.

D. Fedyk, "802.1 aq Shortest Path Bridging Design Implications", IEEE, http://www.ieee802.org/1/files/public/docs2007/aq-fedyk-design-implications-0707-v1.0.pdf, Jul. 2007, entire document, 20 pp.

D. Fedyk et al., "802.1aq Shortest Path Bridging Recap and Status", IEEE, http://www.ieee802.org/1/files/public/docs2008/aq-fedyk-SPB-Recap-Status-0708-v01.pdf, Jul. 2008, entire document, 17 pp.

M. Seaman, "Virtual Bridged Local Area Network: P802.1aq/D1.0: Revision", IEEE, http://www.ieee802.org/1/files/public/docs2008/aq-seaman-cI08-suggested-changes-0708.pdf, Sep. 7, 2008, entire document, 21 pp.

D. Allan et al., "Provider Link State Bridging", IEEE Communication Magazine, Sep. 2008, entire document, 8 pp.

D. Fedyk et al., "Provider Link State Bridging (PLSB)", IEEE, http://www.ieee802.org/1/files/public/docs2007/aq-fedyk-provider-link-state-bridging-0107-01.pdf, Jan. 2007, entire document, 10 pp.

Office Action from U.S. Appl. No. 12/478,857, dated Apr. 13, 2011, 10 pp.

Radia Perlman, Sun Microsystems, Donald Eastlake 3RD, Stellar Switches, Dinesh G. Dutt, Silvano Gai, Cisco Systems, Anoop Ghanwani, Brocade, Jun. 26, 2009, "RBridges: Base Protocol Specification <draft-ietf-trill-rbridge-protocol-13.txt>", Internet Engineering Task Force, IETF; Standard Working Draft, Internet Society (ISOC) 4, Rue Des Falaises CH-1205 Geneva, Switzerland.

Sofia, Rute C.: "A Survey of Advanced Ethernet Forwarding Approaches", IEEE Communications Surveys, IEEE, New York, NY, vol. 11, No. 1, Jan. 1, 2009.

Office Action mailed Jun. 27, 2011 in U.S. Appl. No. 12/508,949, 14 pgs.

Response to Office Action mailed Jun. 27, 2011 in U.S. Appl. No. 12/508,949, filed Sep. 27, 2011, 21 pgs.

EPO Communication pursuant to Article 94(3) EPC mailed Sep. 8, 2011 in EP Application Serial No. 10250779.5, 5 pgs.

P.R.C. Notification of the First Office Action mailed Oct. 26, 2011 in CN Application Serial No. 200910171651.6, 15 pgs.

Notice of Allowance mailed Oct. 24, 2011 in U.S. Appl. No. 12/508,949, 9 pgs.

Response to EP Communication dated Apr. 7, 2011, filed Aug. 3, 2011, in EP application No. 09252095.6, corresponding to U.S. Appl. No. 12/344,644 3 pages.

Notification of the Second Office Action mailed May 21, 2012 from the State Intellectual Property Office of P.R.C. received in corresponding CN Application No. 200910171651.6, 28 pgs.

* cited by examiner

ROUTING FRAMES IN A COMPUTER NETWORK USING BRIDGE IDENTIFIERS

CROSS-REFERENCE TO RELATED APPLICATION

Not applicable.

TECHNICAL FIELD

The present invention relates to the field of computer networking, and in particular to a technique for routing frames in a computer network using bridge identifiers.

BACKGROUND OF THE INVENTION

Early computer networks consisted of a small number of devices attached together using a single cable. Computer networks have since evolved, however, beyond a simple collection of attached devices. Current computer networks may connect thousands of devices spread across large local areas, and these local area networks may in turn be connected together to form still larger networks such as, for example, the Internet.

Today's computer networks often interconnect widely-disparate devices distributed throughout multiple local networks into a single virtual network. Virtual networking technology allows devices located on a single physical network to operate as part of multiple virtual networks. Such virtual networks provide flexibility not available in early computer networks and allow network administrators to create layers of abstraction to simply complex network topologies. For example, using a virtual network, an enterprise may have a virtual blade server chassis with routers spread across multiple physical locations that allow a data center which is split across multiple sites to act as if the data center is at a single site.

The predominate standard used to construct and access today's computer networks is Ethernet. Ethernet is a family of frame-based computer networking technologies for local area networks. Ethernet is promulgated by Institute of Electrical and Electronics Engineers (IEEE) in various standards specifications as part of the IEEE 802 family of standards. Ethernet defines a number of wiring and signaling standards for the Physical Layer of the Open Systems Interconnection (OSI) Networking Model, the means for network access at the Media Access Control (MAC) and Data Link Layer, and a common addressing format. At the physical layer, Ethernet networks are ubiquitous, carrying all kinds of traffic over multiple types of physical connections (wired or wireless), including 10 Mbps, 100 Mbps, 1 Gbps, 10 Gbps, 100 Gbps connections. The Ethernet service layer, generally referred to as Layer-2 because it is the MAC and Data Link Layer in the OSI networking model, provides the services generally required by a network. These network services typically include filtering, replication, forwarding broadcast, unicast, and multicast (BUM) traffic, and following a serviced topology, which may include virtual local area networks (VLANs), ATM segments of VLANs based on the ATM Lane Standard (ELANs), Ethernet Private Lines (ELINEs), and rooted multipoint Ethernet virtual connections (ETREEs).

VLAN services are specified in the IEEE 802.1Q standard and allow enterprise customers to configure various computing devices to communicate as if those devices were attached to the same broadcast domain, regardless of their physical locations. VLANs provide segmentation services traditionally provided by routers in local area network (LAN) configurations and address issues such as scalability, security, and network management. Bridges in VLAN topologies enforce the integrity of VLAN broadcast domains because such bridges are not permitted to bridge network traffic between VLANs. In this way, VLANs may provide broadcast filtering, security, address summarization, and traffic flow management. Network administrators may use VLANs to create multiple Layer 3 networks on the same Layer-2 bridge. For example if a Dynamic Host Configuration Protocol (DHCP) server, which broadcasts its presence, were plugged into a bridge, the DHCP server would serve any host device connected to the bridge. By using VLANs, however, a network administrator may easily split up the devices on the network so that some hosts will not use that DHCP server and will default to link-local addresses.

Because enterprise customers often have multiple networks distributed across multiple physical sites, customer's typically connected these physically separate networks together through the network of a network provider. For example, a company may connect its network at site A to its network at site B through a network provided by a telecommunications company. Despite the customer networks being connected through a provider network, devices on the different customer networks may still use VLAN services to communicate through the provider's network as though the devices were all located on the same LAN.

For the same reasons that enterprise customers take advantage of the VLAN services described in the IEEE 802.1Q specification, network providers also take advantage of VLAN services to provide flexibility, security, traffic flow management, and reduce their network administration burden. The drawback, however, is that under the IEEE 802.1Q specification, there are only 4096 identifiers available to specify different VLANs. Thus, a network provider and all the customers that provider serves must share the 4096 VLAN identifiers.

Because industry participants deemed such a limited number of VLAN identifiers inadequate to meet the needs of both customers and providers, the IEEE 802.1Q standard was amended by the IEEE 802.ad standard, often referred to as "Q-in-Q" or "stacked VLANs." The IEEE 802.ad standard sets forth an architecture and bridge protocol to provide separate instances of MAC network services to multiple independent users of a provider network in a manner that does not require cooperation among the customers, and requires a minimum of cooperation between the customers and the provider of the MAC network service. Q-in-Q provides customers with the ability to configure their own VLANs inside the VLAN provided to the customer by a service provider. In such a manner, the service provider may configure one VLAN for the customer, and the customer can utilize that service provider VLAN to establish multiple customer VLANs.

In a manner similar to enterprise customers, network service providers often maintain multiple provider network domains, which are bridged together using a provider backbone bridging network. IEEE promulgates specifications for such a provider backbone bridging network in the IEEE 802.1ah standard. IEEE 802.1ah compliant networks provide complete separation of customer and service provider domains by encapsulating Ethernet frames with a service provider MAC header. Because the Ethernet frames are originally encapsulated in the customer network with a customer MAC header, this subsequent encapsulation with a service provider MAC header is often referred to as 'MAC-in-MAC encapsulation.' Using MAC-in-MAC encapsulation, Ethernet frames being sent in a customer's network from one domain to another through multiple service provider network domains contain two MAC headers. The customer MAC header provides routing information to the bridges in the customer's networks, while the service provider MAC header provides routing information to the bridges in the service provider's backbone bridging network.

To provide an overview of Ethernet header stacking of encapsulation, FIG. 1 sets forth a line drawing that illustrates exemplary Ethernet frame structures compliant with the IEEE 802.1 family of standards. FIG. 1 illustrates a traditional Ethernet frame 100 implemented in a customer's network according to the IEEE 802.1D standard. The customer frame 100 consists of a payload 101, a header type (EthType) 102 indicating that frame 100 is an 802.1D frame, a customer network source MAC address (C-SA) 103, and a customer network destination MAC address (C-DA) 104. The customer network source MAC address 103 specifies the source node in the customer network that originates the frame 100, while the customer network destination MAC address 104 specifies the destination node in the customer network to which the frame is bound for delivery.

As mentioned above, a customer may organize the nodes into varies VLANs to provide traffic flow management, security, ease network administration, and the like. VLANs established by a customer for use within the customer's networks are generally referred to a 'customer VLANs.' In a network using customer VLANs, frame 100 is encapsulated as frame 110 to include a customer VLAN identifier (C-VID) 115 and a new header type (EthType) 116, indicating that the frame 110 is an 802.1Q frame. As used in this application, encapsulation may allow additional fields to be placed in any position relative to the encapsulated object, including interior to the original object, and does not require the additional fields be placed surrounding or at either end of the encapsulated object.

In a provider bridge (PB) network that bridges two customer networks, the frame 110 is further encapsulated as shown by frame 120, adding new fields for: a service VLAN identifier (S-VID) 127, and a new header type (EthType) 128 indicating the frame 120 is IEEE 802.1ad compliant. In a provider backbone bridging (PBB) network that bridges multiple PB networks, the frame 120 is further encapsulated to add additional fields for: a service identifier (I-SID) 131, a new header type (EthType) 132 corresponding to the service identifier 131, a backbone VLAN identifier 133, an additional header type (EthType) 134 indicating that the frame 130 is IEEE 802.1ah compliant, a backbone source MAC address (B-SA) 135 specifying the bridge through which the frame ingresses into the PBB network, and a backbone destination MAC address (B-DA) 136 specifying the bridge through which the frame egresses the PBB network.

For further explanation of header stacking or encapsulation in a IEEE 802.1ad provider bridge network, FIGS. 2 and 3 set forth network diagrams that illustrate an exemplary provider bridge network 200 interconnecting exemplary networks for customers A and B (201 and 202, respectively). In FIGS. 2 and 3, customer A 201 maintains three networks 203, 205, 207, while customer B 202 maintains two networks 204, 206. The provider bridge network 200 consists of six bridges, four provider edge bridges (PEB) 1-4 and two provider core bridges (PCB) 1-2. An edge bridge is a bridge through which packets ingress and egress the network 200—that is, an edge bridge is positioned at the 'edge' of the network topology. A core bridge is a bridge used to interconnect one or more edge bridges.

FIG. 2 illustrates a frame 220 at several stages as the frame 220 traverses the networks of FIG. 2 from customer equipment (CE)-11 210 in network 203 of customer A 201 to CE-31 212 in network 205 of customer A 201. In FIG. 2, the communications between CE-11 210 and CE-31 212 are implemented using a customer VLAN, and so the frame 220a from CE-11 210 is encapsulated with a customer VLAN header 230 that includes a customer VLAN identifier (C-VID) and a header type (EthType) specifying that the frame 220a is an IEEE 802.1Q compliant frame. The frame 220 includes a source MAC address (CE-11-SA) for CE-11 210, which indicates that CE-11 210 originated the frame (220a), and a destination MAC address (CE-31-DA) for CE-31 212, which indicates that the frame 220 is destined for CE-31 212.

When provider edge bridge (PEB)-1 240 receives the frame 220a, PEB-1 240 encapsulates the frame 220a into an 802.1ad frame 220b by adding a service VLAN header 231 to the frame 220. The service VLAN header 231 includes a service VLAN identifier (S-VID-A) assigned by the provider to customer A 201 and a header type (EthType) specifying that the frame is IEEE 802.1ad compliant. Using the service VLAN identifier to identify devices in the networks 203, 205, 207 of customer A 201, the provider bridges learn information about the MAC addresses of the computing devices in customer A's networks. From the learned MAC information, the provider bridges route the frame 220 through the provider network 200 from the PEB-1 240 through which the frame 220 ingresses the network 200 to the PEB-3 242 through which the frame 220 egresses the network 200. PEB-3 242 then de-encapsulates the frame 220b by removing to service VLAN header 231, leaving IEEE 802.1Q compliant frame 220a for delivery to CE-31 212.

Similarly, in FIG. 3, computing device CE-15 310 in network 204 of customer B 202 sends an IEEE 802.1Q compliant frame 320a to device CE-25 312 customer B's network 206. At PEB-1 240, frame 320a is encapsulated with a service VLAN header 331. The service VLAN header 331 includes a service VLAN identifier (S-VID-B) assigned by the service provider to customer B 202 and a header type (EthType) specifying that the frame is IEEE 802.1ad compliant. The ingress bridge 240 of the provider network 200 forwards the frame 320b to the egress bridge 342 of the provider network 200, which in turn de-encapsulates the frame 320b by removing the service VLAN header 331, leaving IEEE 802.1Q compliant frame 320a for delivery to CE-35 312. As the provider bridges receive various packets on their ports, the bridges learn the MAC addresses of the devices in customer B network by monitoring the MAC addresses associated with each service VLAN identifier assigned to customer B 202 by the network provider.

From the description above, readers will note that in a provider bridge network, the service provider uses one or more SVLANs to transport frames for a customer's VLANs between multiple customer networks. To determine the forwarding path for each service VLAN through the provider's bridge network, the provider bridges often use the Generic VLAN registration protocol (GVRP) or the Multiple VLAN Registration Protocol (MVRP). For multicast traffic containment, provider bridges may use the Generic Attribute Registration Protocol Multicast Registration Protocol (GMRP) or the Multiple Multicast Registration Protocol (MMRP). For purposes of forwarding traffic, provider edge bridges learn all customer equipment MAC addresses and forward customer frames based on service VLAN identifier and customer VLAN identifier pairs, while provider core bridges learn all customer equipment MAC addresses, but forward customer frames based only on the service VLAN identifiers. Within a particular provider bridge network, a given customer equipment MAC address is at the same site for all service VLANs.

Even with the stacked VLAN protocols, provider bridge networks have scaling problems. Because only 4,096 service VLAN identifiers are available under current protocols, provider bridge networks are limited in the number of customer networks they can serve effectively and efficiently. Further, because provider bridges learn the MAC addresses for all customer devices, scaling issues often arise when a provider serves one or more customers with large virtual networks. In addition, there is a potential for interaction between customer and service provider control protocols.

Provider Backbone Bridge (PBB) Networks are one attempt to alleviate these issues because PBB networks allow a service provider to partition a large provider bridge network into several smaller provider bridge networks that are interconnected by the PBB network. For further explanation, FIG. 4 sets forth a network diagram that illustrates an exemplary provider backbone bridge network 400 interconnecting exemplary provider bridge networks 410, 420, 430. The PBB network 400 of FIG. 4 consists of four provider backbone edge bridges (BEB)—that is, BEB-11 416, BEB-12 418, BEB-21 434, and BEB-22 436—and two provider backbone core bridges (BCB)—that is, BCB-1 401 and BCB-2 402.

FIG. 4 illustrates a frame 412 at several stages as the frame 412 traverses the networks of FIG. 4 from customer equipment (CE)-11 411 to CE-34 431. The customer utilizing the PB networks 410, 430 and the PBB network 400 has grouped CE-11 411 and CE-34 431 in the same customer VLAN. Thus, frame 412a from CE-11 411 includes a customer VLAN header 415. The customer VLAN header 415 includes the customer VLAN identifier (C-VID) assigned by the customer for the customer VLAN and a header type (EthType) that specifies that the frame 412a is IEEE 802.1Q compliant.

When the frame 412a reaches the provider edge bridge (PEB)-11 413, PEB-11 413 encapsulates the frame with a service VLAN header 417. The service VLAN header 417 includes the service VLAN identifier (S-VID) assigned to the customer by the network provider and a header type (EthType) that specifies that the frame 412a is IEEE 802.1ad compliant.

When the frame 412b reaches the provider backbone edge bridge (BEB)-11 416, BEB-11 416 encapsulates the frame with a backbone header 419. The backbone header 419 includes a service identifier (I-SID), a new header type (EthType) corresponding to the service identifier, a backbone VLAN identifier, an additional header type (EthType) indicating that the frame 412c is IEEE 802.1ah compliant, a backbone source MAC address (BEB-11-SA) specifying the backbone edge bridge through which the frame ingresses into the PBB network 400, and a backbone destination MAC address (BEB-22-DA) specifying the backbone edge bridge 436 through which the frame egresses the PBB network 400.

The frame 412c is routed through the provider backbone bridge network 400 from the ingress bridge, BEB-11 416, to the egress bridge, BEB-22 436. BEB-22 436 de-encapsulates the frame 412c by removing the backbone header 419, leaving the frame 412 IEEE 802.1ad compliant. BEB-22 436 then sends the frame 412 along to PEB-31 433 in the IEEE 802.1ad compliant provider bridge network 430. PEB-31 433 further de-encapsulates the frame 412 by removing the service VLAN header 417, leaving the frame 412 IEEE 802.1Q compliant. PEB-31 433 then forwards the frame 412 along to CE-34 431 for delivery.

In a provider backbone bridge network, readers will note that there is clear demarcation between customer and service provider domains. MAC address learning for customer equipment is limited to the provider edge bridge, and the I-SID field allows separation of Ethernet as a service from Ethernet as infrastructure.

As mentioned above, the networking architectures described by the IEEE 802.1Q, 802.1ad, and 802.1ah standards allow enterprise customers to establish multiple networks that are geographically dispersed, yet operate as a single virtual network. These physically separate LANs communicate through PB and PBB networks using forwarding trees established using a spanning tree protocol. The spanning tree protocol is an OSI Layer-2 protocol that ensures a loop-free topology for any bridged LAN. This protocol allows a network design to include spare (redundant) links to provide automatic backup paths if an active link fails, without the danger of bridge loops, or the need for manual enabling or disabling of these backup links. Bridge loops must be avoided because such loops result in traffic that floods the network. The spanning tree protocol is defined in the IEEE 802.1D standard, and, as the name suggests, it creates a spanning tree within a mesh network of connected Layer-2 bridges, and disables those links that are not part of the tree, leaving a single active path between any two network nodes.

There are certain disadvantages to the spanning tree protocol used in the networks described above with reference to FIGS. 1-4. Because the spanning tree protocol disables links that are not part of the forwarding tree, bottlenecks are often created by concentrating traffic onto selected links. Also, due to the nature of the spanning tree protocol temporary loops may develop if spanning tree messages are lost or as the network topology changes because nodes are brought on-line or taken off-line or moved in the network. During periods when temporary loops exists, frames may flood the network because the standard Ethernet header does not contain a time-to-live field or hop count that specifies when a frame has become stale and should be discarded. Further, the paths developed between nodes of the network are not necessarily the pair-wise shortest path, but rather are the paths that remain after the spanning tree protocol eliminates redundant paths.

In an attempt to create a network solution without the disadvantages of the spanning tree protocol, the Internet Engineering Task Force (IETF) has sought developed additional protocols. One such protocol is the "Transparent Interconnection of Lots of Links" (TRILL) protocol. The TRILL protocol and other similar specifications require the use of router-bridges (R-Bridges) to routes frames hop-by-hop through the network along the shortest path to the frames destination in the network, e.g., the network's edge bridge. For further explanation, FIG. 5 sets forth a network diagram that illustrates an exemplary TRILL network 500, also known as a router-bridge network, because the devices behave as both a router and a bridge at the ISO Layer-2 level. The TRILL network 500 includes three core router-bridges (CRB)—that is, CRB-4 540, CRB-5 542, and CRB-6 544—as well as five edge router-bridges (ERB)—that is, ERB-1 530, ERB-2 532, ERB-8 534, ERB-9 536, and ERB-7 538. The TRILL network 500 is provided to customers by a network provider. The edges of the TRILL network 500 typically extend into the datacenter where the customer equipment is housed. In fact, often each equipment rack includes a bridge that operates as an edge of the TRILL network 500. These TRILL networks can extend throughout one or more datacenters to interconnect various networks.

The TRILL network 500 of FIG. 5 interconnects two IEEE 802.1Q networks 510, 520. 802.1Q network 510 is connected to the TRILL network 500 through ERB-1 530 and ERB-2 532. 802.1Q network 520 is connected to the TRILL network 500 through ERB-8 534 and ERB-536. 802.1Q network 510 includes a legacy bridge (LB)-55 514 and a enterprise bridge (EB)-16 516, neither of which are TRILL compliant. 802.1Q network 520 includes EB-85 524 and EB-96 526. End point devices include customer equipment (CE)-11 512 connected to LB-55 514, CE-31 522 connected to EB-85 524, and CE-77 539 connected to ERB-7 538. End point devices CE-11 512, CE-31 522, and CE-77 539 can be any type of computing device, including workstations, servers, network devices, and so on.

FIG. 5 illustrates a frame 518 at several stages as the frame 518 traverses the networks of FIG. 5 from CE-11 512 to CE-31 522. The customer utilizing the TRILL network 500 to bridge multiple 802.1Q networks has grouped CE-11 512 and CE-31 522 in the same customer VLAN. Thus, frame 518a sent by LB-55 514 for CE-11 512 includes a customer VLAN header 519. The customer VLAN header 519 includes the customer VLAN identifier (C-VID) assigned by the customer for the customer VLAN and a header type (EthType) that specifies that the frame 518a is IEEE 802.1Q compliant.

When the frame 518a reaches the ERB-1 530, ERB-1 530 encapsulates the frame 518 with a TRILL header 551. The TRILL header 551 includes a TRILL source nickname (ERB-1-SN) specifying ERB-1 as the ingress edge router-bridge for the frame 518, a TRILL destination nickname (ERB-8-DN) specifying ERB-8 534 as the egress edge router-bridge for the frame 518, various TRILL flags, a hop count, and a header type (EthType) indicating that frame 518b is a TRILL frame. TRILL nicknames are assigned to every router-bridge in a TRILL network using a dynamic nickname acquisition protocol or other protocols as will occur to those of skill in the art.

ERB-1 530 also encapsulates the frame 518 with an Ethernet MAC header 552. The MAC header 552 includes a outer transport VLAN identifier (OT-VLAN-ID), a header type (EthType), a source MAC address (ERB-1-SA) specifying ERB-1 530 as the node transmitting the frame 518b on the next network hop through the network 500, and a destination MAC address (CRB-5-DA) specifying CRB-5 542 as the node receiving the frame 518b on the next network hop through the network 500. ERB-1 530 then sends the frame 518 to CRB-5 542, which routes the frame through the TRILL network 500 to CRB-4 540 based on a shortest path to ERB-8 534. As the frame traverses the TRILL network 500, the MAC header 552 is changed at each hop to update the source and destination MAC addresses for the next network hop. Accordingly, when the frame 518c passes from CRB-4 540 to ERB-8 534, the frame 518 includes MAC header 562. The MAC header 562 of FIG. 5 includes a source MAC address (CRB-4-SA) specifying CRB-4 540 as the node transmitting the frame 518c on the next network hop through the network 500 and a destination MAC address (ERB-8-DA) specifying ERB-8 534 as the node receiving the frame 518c on the next network hop through the network 500. Upon receiving the frame 518c, ERB-8 534 de-encapsulates the frame 518 by removing the MAC header 562 and the TRILL header 551, leaving frame 518a for delivery to CE-31 522 through EB-85 524.

Readers will note that the TRILL network 500 operates as a massive switch fabric from the perspective of the customer network. Frames enter the TRILL network at an ingress bridge and are routed along the shortest path hop-by-hop through the TRILL network to an egress bridge for delivery to a customer network. As the bridges in the TRILL network learn the MAC address of the customer equipment in the customer networks to which the TRILL bridges connect, TRILL bridges share information among one another about which customer MAC addresses are related to which TRILL bridge nickname. ISO Layer-2 frames with known unicast addresses are routed hop-by-hop based on TRILL nicknames of the ingress and egress edge router-bridges by the transit or core router-bridges. ISO Layer-2 multicast traffic can also be routed hop-by-hop based on multicast distribution trees.

In addition to TRILL, there are other provider bridging protocols such as Shortest Path Provider Backbone Bridging (SPPBB) described in IEEE 802.1aq that represent attempts by industry participants to utilize the shortest path through the network to forward frames between edge bridges. One feature common to all of these solutions however, whether TRILL, SPPBB, or any other, is the use of MAC-in-MAC encapsulation. Unfortunately, current generation hardware for typical rack-mounted bridges that form the edge of these networks do not support MAC-in-MAC encapsulation, thereby limiting the use of TRILL, SPPBB, and similar solutions that provide shortest path routing at Layer-2 level.

BRIEF SUMMARY OF THE INVENTION

Methods, apparatus, and products are disclosed for routing frames in a network using bridge identifiers. Routing frames in a network using bridge identifiers according to embodiments of the present invention advantageously does not require edge bridges that support MAC-in-MAC encapsulation to overcome the 4096 VLAN identifier limitation across multiple, interconnected IEEE 802.1Q networks. Rather, such edge bridges need only be updated with software improved for routing frames using bridge identifiers according to embodiments of the present invention. In this manner, existing rack-mounted bridges may be utilized as edge bridges in networks that require MAC-in-MAC encapsulation to provide shortest path forwarding services such as, for example, TRILL networks or SPB networks.

In accordance with embodiments of the present invention, the network in which frames are routed using bridge identifiers includes a plurality of bridge nodes. At least one of the bridge nodes operates as an ingress bridge node through which frames are received into the network. At least one of the bridge nodes operates as an egress bridge node through which frames are transmitted out of the network. The ingress bridge node receives a frame from a source node through another computer network. The frame specifies a source node address for the source node originating the frame and a destination node address for a destination node to which the frame is transmitted. The ingress bridge node retrieves an ingress bridge identifier for the ingress bridge node and identifies an egress bridge identifier for the egress bridge node in dependence upon the destination node address specified by the frame. The ingress bridge node then adds the ingress bridge identifier and the egress bridge identifier to the frame and routes the frame through the computer network to the egress bridge node through which the destination node connects to the network.

In accordance with embodiments of the present invention, a core bridge node receives, from the ingress bridge node, a frame for transmission to a destination node. The destination node connects to the network through the egress bridge node. The frame includes an ingress bridge identifier and an egress bridge identifier. The core bridge node then routes the frame to the egress bridge node through which the destination node connects to the network in dependence upon the ingress bridge identifier and the egress bridge identifier included in the frame.

In accordance with embodiments of the present invention, another core bridge node connected to the egress bridge node by a single network hop receives a frame for transmission to a destination node. The destination node connects to the network through the egress bridge node. The frame has a shortest path bridging header that includes an ingress bridge nickname and an egress bridge nickname. The core bridge node connected to the egress bridge node then determines that the frame traverses the egress bridge node on the next network hop. In response to the determination, the core bridge node replaces the shortest path bridging header with an ingress bridge identifier and an egress bridge identifier and routes the frame to the egress bridge node.

In accordance with embodiments of the present invention, the egress bridge node receives a frame for transmission to a destination node connected to the network through the egress bridge node. The frame includes an ingress bridge identifier and an egress bridge identifier. The egress bridge node removes the ingress bridge identifier and the egress bridge identifier from the frame and routes the frame for delivery to the destination node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE SEVERAL VIEWS OF THE DRAWINGS

The accompanying drawings, which are incorporated in and constitute a part of this specification, illustrate implementations consistent with the present invention and, together with the detailed description, serve to explain advantages and principles consistent with the invention.

DETAILED DESCRIPTION OF THE INVENTION

While certain exemplary embodiments are described in detail and shown in the accompanying drawings, it is to be understood that such embodiments are merely illustrative of and not devised without departing from the basic scope thereof, which is determined by the claims that follow.

Although the following disclosure is discussed using terminology related to Ethernet links, various IEEE 802 standards and TRILL, these are merely by way of example and illustration, and the scope of the present invention is not so limited, but extends to the fullest scope defined by the claims herein.

Typical edge bridges used in conjunction with rack-mounted equipment do not support the MAC-in-MAC encapsulation required in current shortest path provider backbone bridging network solutions, such as for example TRILL network solutions. When modified for routing frames in a computer network using bridge identifiers according to embodiments of the present invention, however, such bridges can be used as part of a TRILL or other shortest path provider backbone bridging network solution even though their hardware does not support MAC-in-MAC encapsulation.

Figure 6A:
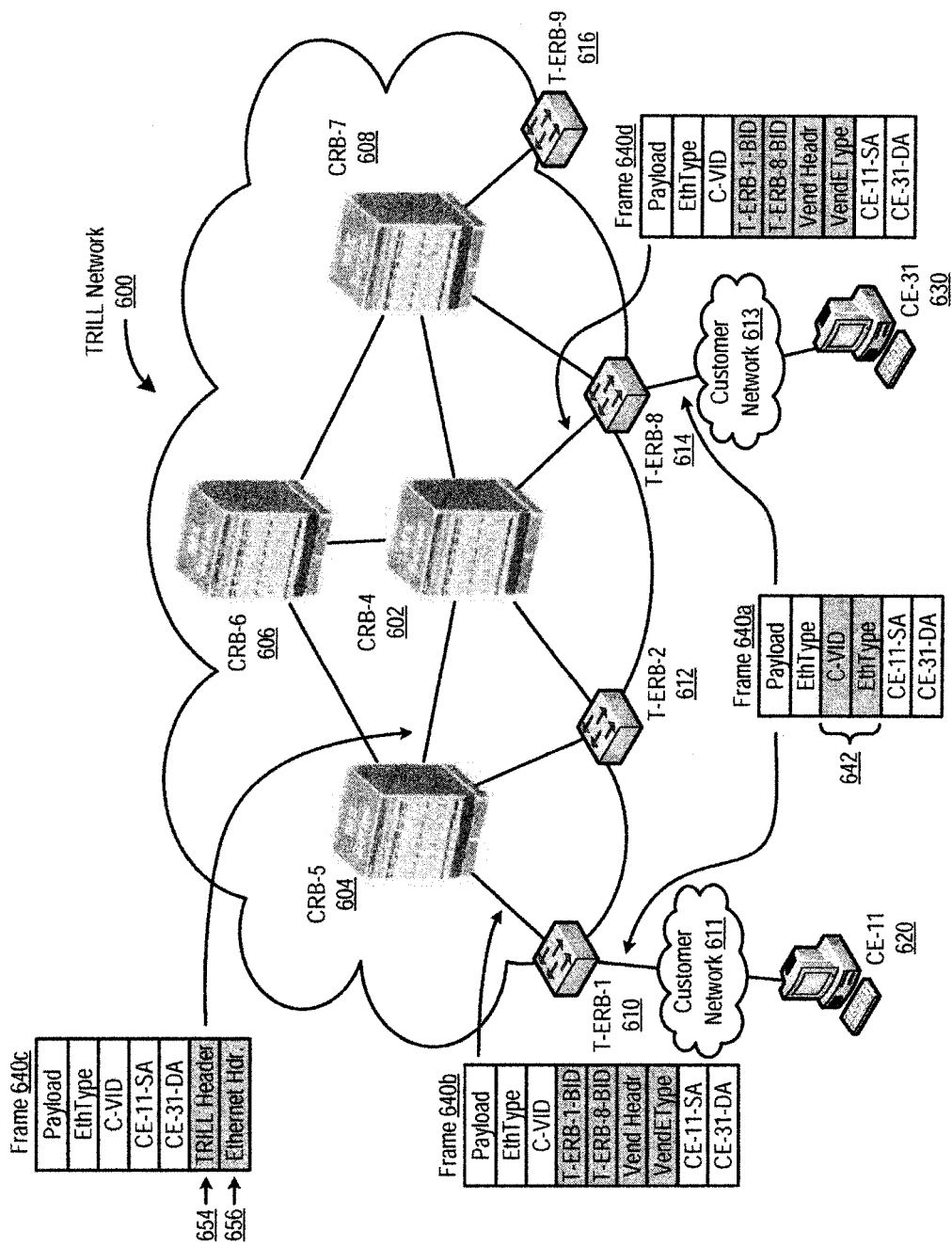
FIG. 6A sets forth a network diagram that illustrates a TRILL network having bridges that support routing frames in a computer network using bridge identifiers according to embodiments of the present invention.

For further explanation, FIG. 6A sets forth a network diagram that illustrates a TRILL network having bridges that support routing frames in a computer network using bridge identifiers according to embodiments of the present invention. The TRILL network of FIG. 6A includes four core router-bridges (CRB)—that is, CRB-4 602, CRB-5 604, CRB-6 606, and CRB-7 608—and four edge router-bridges implemented as top-of-rack devices (T-ERB)—that is, T-ERB-1 610, T-ERB-2 612, T-ERB-8 614, and T-ERB-9 616. In the example of FIG. 6A, the TRILL network 600 interconnects customer equipment (CE)-11 620 and CE-31 630. CE-11 620 connects to the TRILL network 600 through T-ERB-1 610, while CE-31 630 connects to the TRILL network 600 through T-ERB-8 614.

FIG. 6A illustrates frame 640 in various stages as the frame 640 traverses the networks of FIG. 6A. In FIG. 6A, the network administrator managing CE-11 620 and CE-31 630 has grouped CE-11 620 and CE-31 630 into a customer VLAN for data communications. Accordingly, frame 640 of FIG. 6A includes a customer VLAN header 642 that includes a customer VLAN identifier (C-VID) identifying the particular customer VLAN to which the CE-11 620 and CE-31 630 are assigned. The VLAN header 642 also includes a header type (EthType) specifying that the frame is an IEEE 802.1Q compliant frame. The frame 640a also includes a source MAC address (CE-11-SA) designating CE-11 620 as the originator of the frame 640a and a destination MAC address (CE-31-DA) designating CE-31 630 as the destination node to which the frame 640 is transmitted.

In the example of FIG. 6A, T-ERB-1 610 receives the frame 640a from CE-11 620 through customer network 611.

T-ERB-1 610, along with other bridges in the TRILL network 600, utilizes bridge identifiers for the ingress bridge and the egress bridges to route the frame 640 through the network. The bridge identifiers are identifiers unique to each of the bridges in the TRILL network 600. Typically, the bridges in the network 600 negotiate among one another the values that each bridge will use as its bridge identifier much in the same manner that the bridges will negotiate the nicknames that they use according to the TRILL protocol. In fact, the value that a bridge uses for its bridge identifier may be the same value that the bridge uses for its TRILL nickname. However, readers will understand that the same value need not be used because the bridge identifier is distinct from the TRILL nickname for any particular edge bridge. That is, the bridge identifier is generally part of a customized vender header that does not conform to the TRILL protocol, while the TRILL nickname is part of the TRILL header used to route frames according to the TRILL protocol. The bridges in a network may negotiate unique bridge identifiers among themselves using any dynamic acquisition control protocol as will occur to those of skill in the art.

Figure 1:
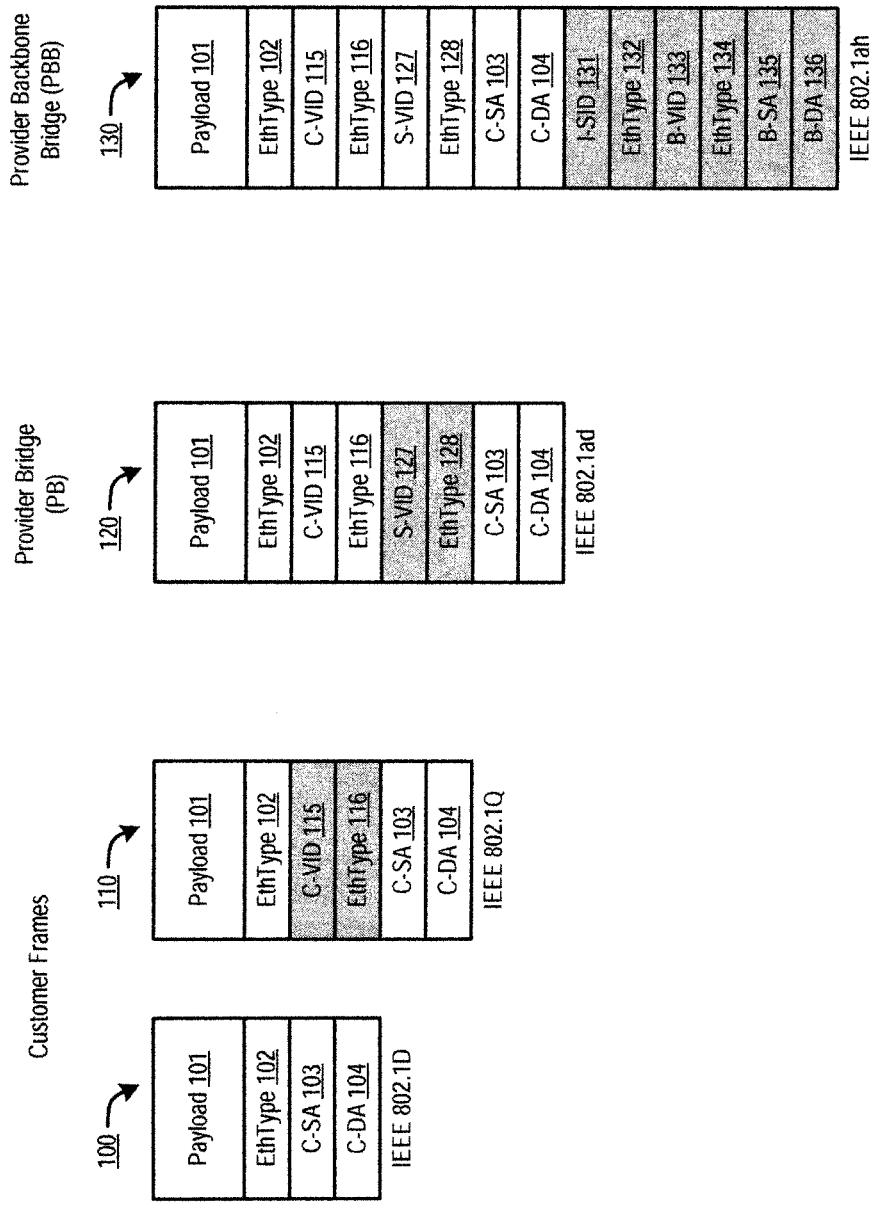
FIG. 1 sets forth a line drawing that illustrates exemplary Ethernet frame structures compliant with the IEEE 802.1 family of standards.
Figure 2:
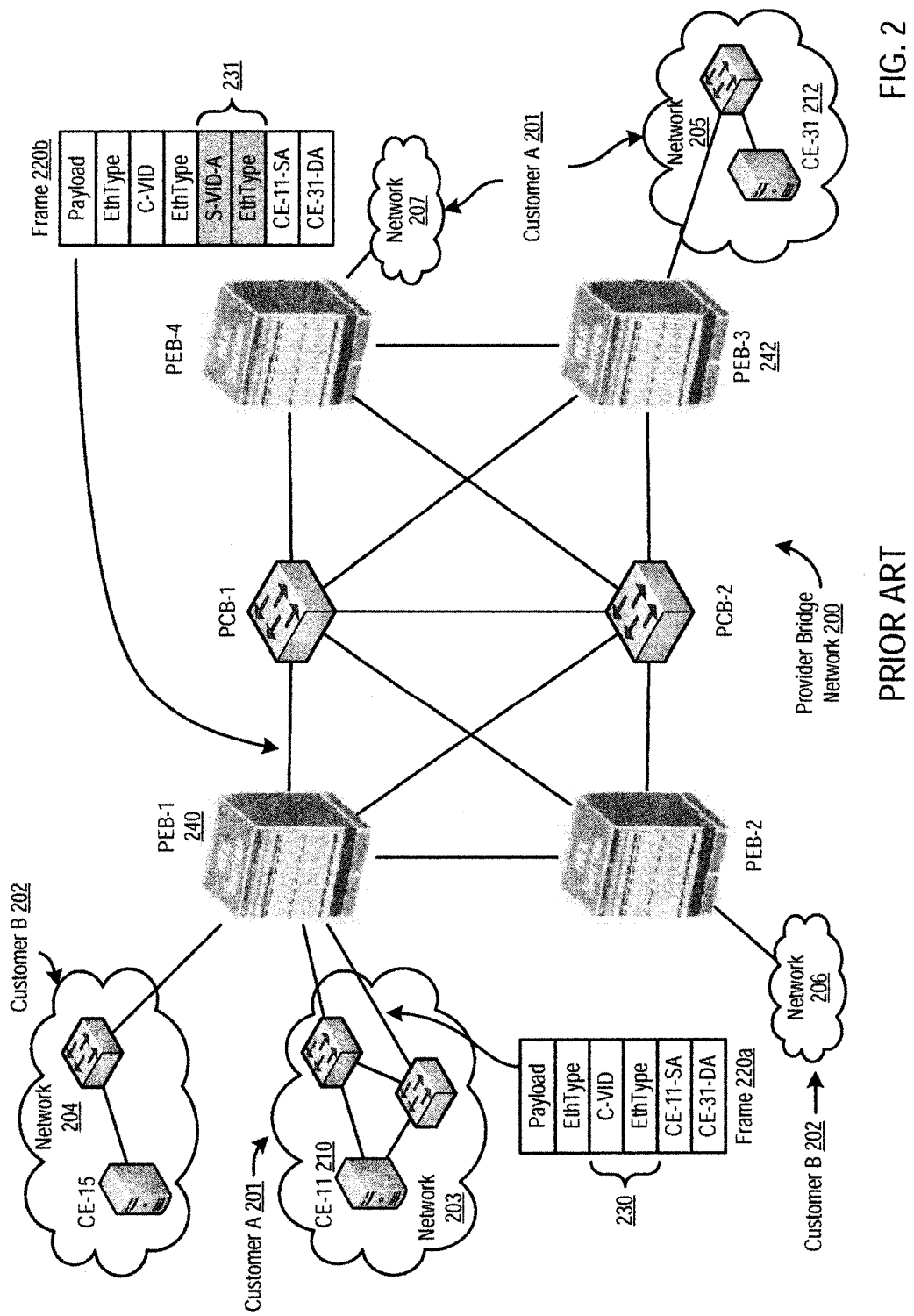
FIG. 2 sets forth a network diagram that illustrates an exemplary provider bridge network interconnecting exemplary customer networks.
Figure 3:
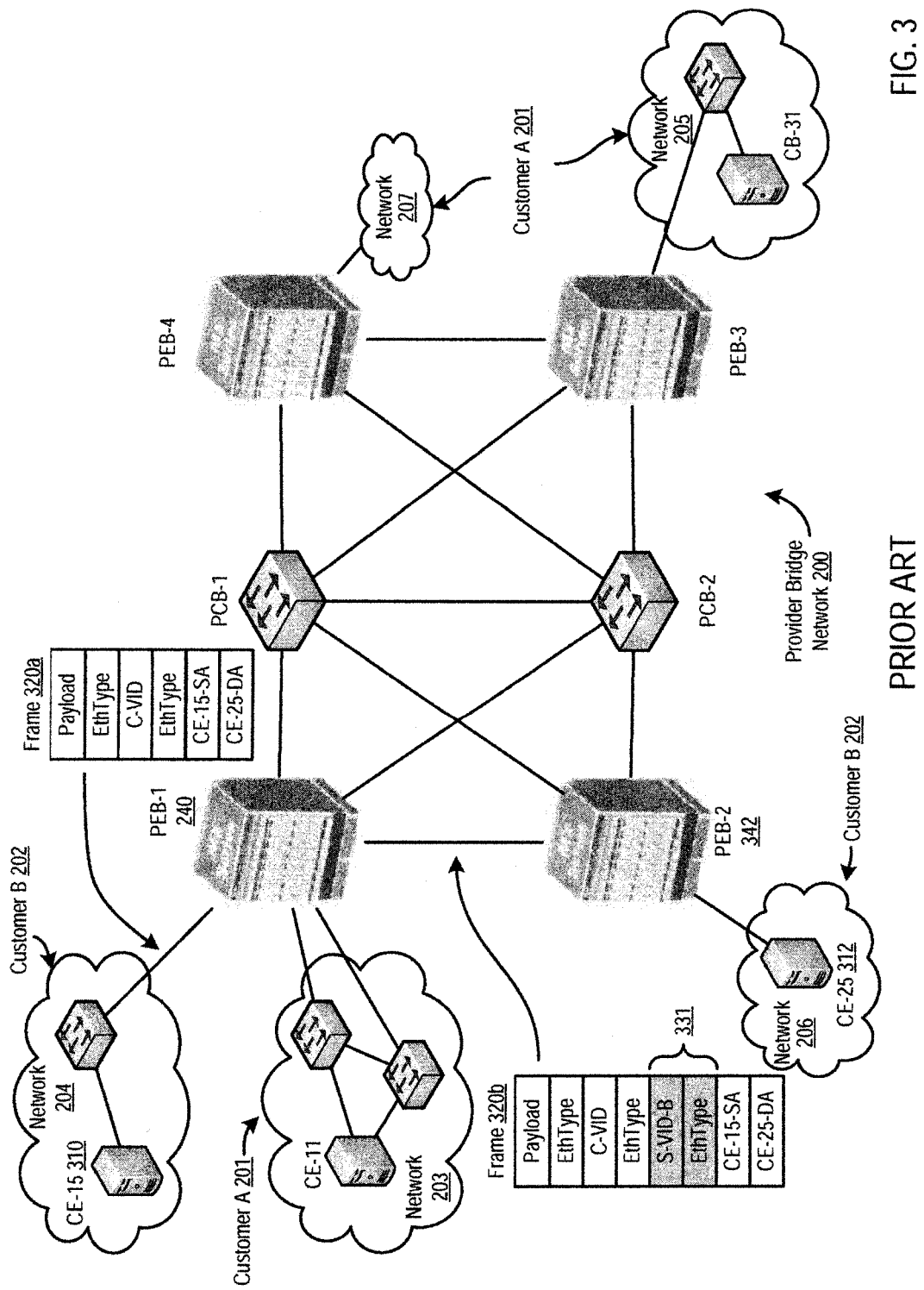
FIG. 3 sets forth a network diagram that illustrates an exemplary provider bridge network interconnecting exemplary customer networks.
Figure 4:
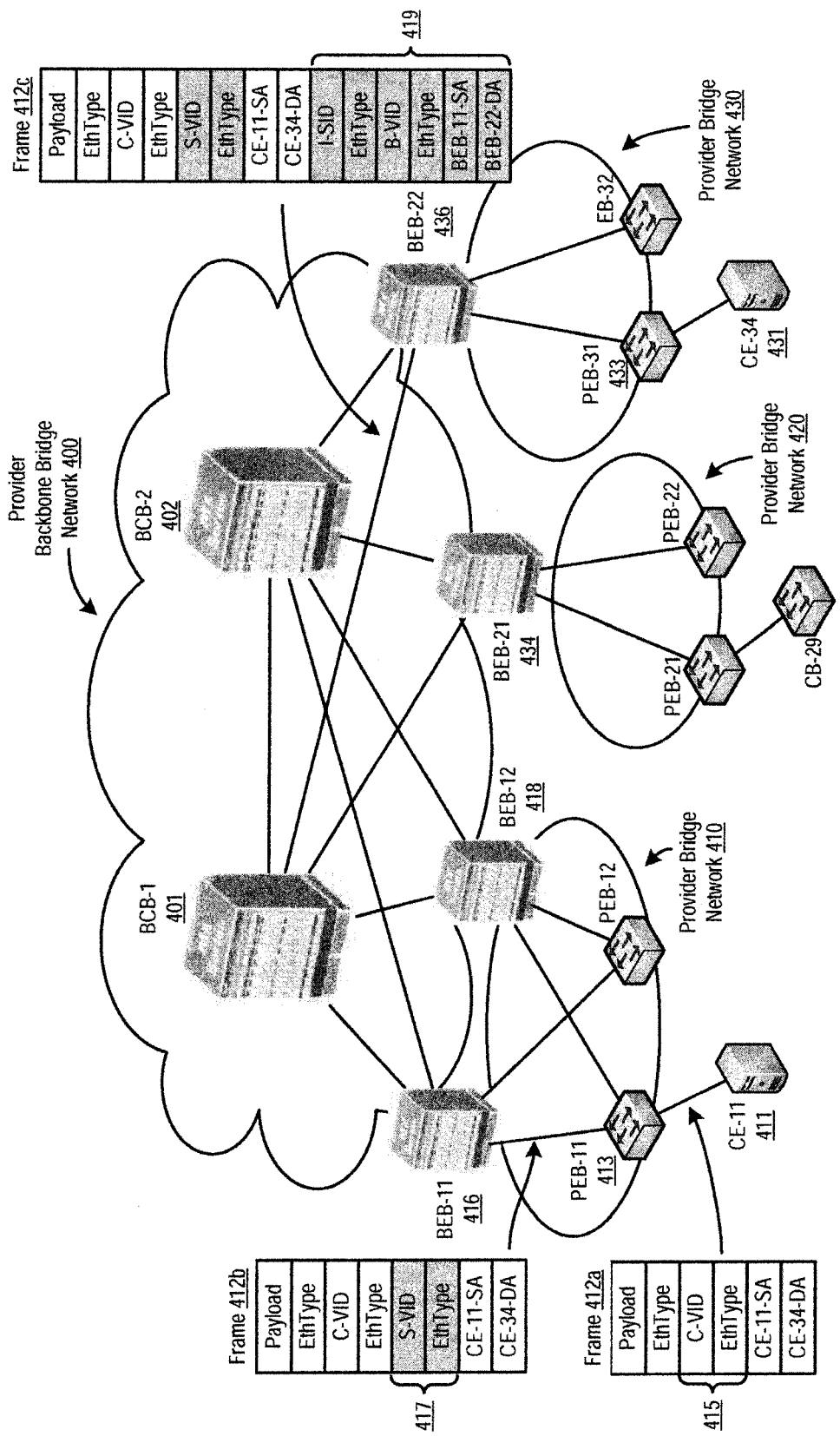
FIG. 4 sets forth a network diagram that illustrates an exemplary provider backbone bridge network interconnecting exemplary provider bridge networks.
Figure 5:
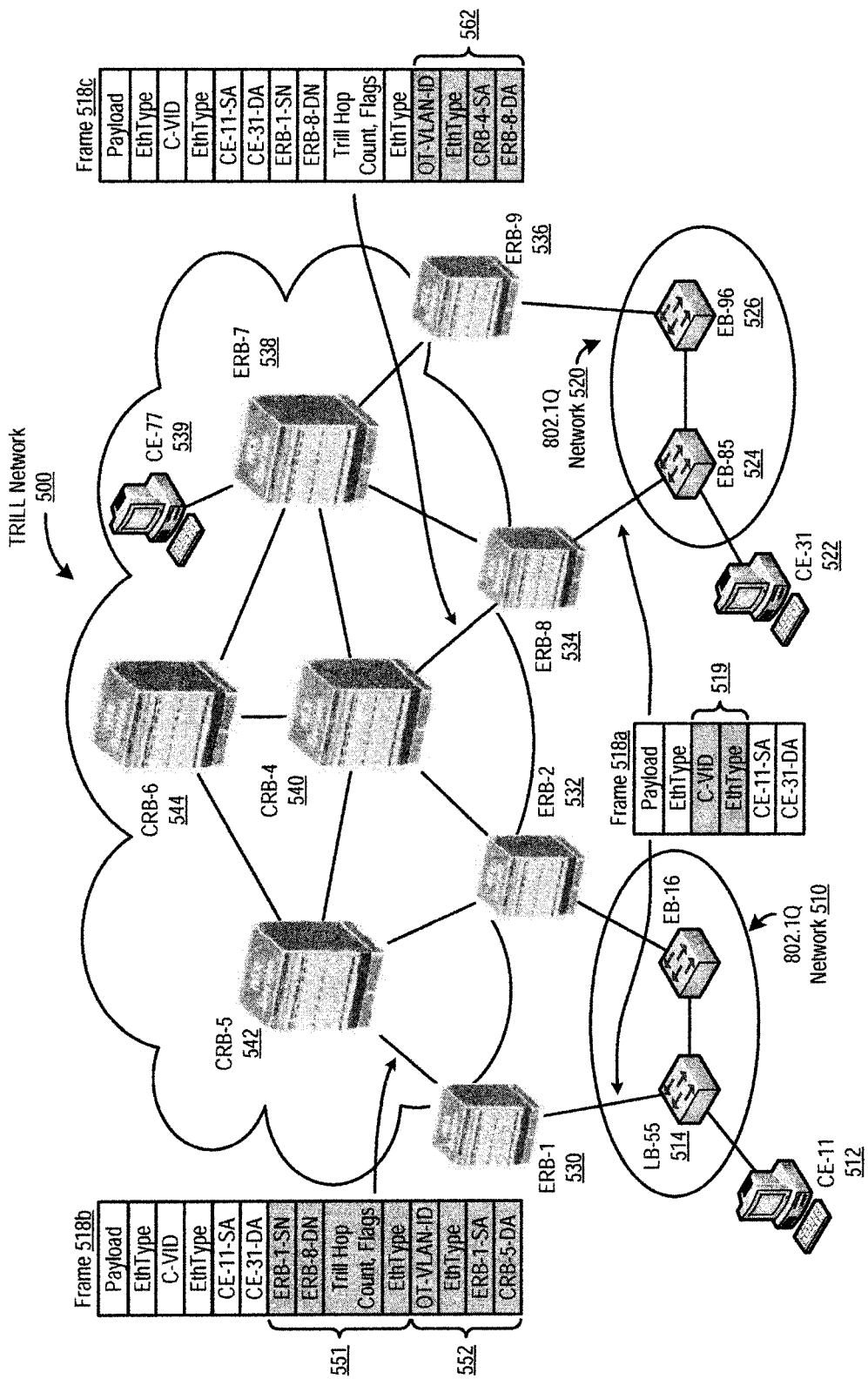
FIG. 5 sets forth a network diagram that illustrates an exemplary TRILL network.

Having a bridge identifier in a vender header distinct from the TRILL nickname in the TRILL header allows bridges to be utilized as edge bridges in the TRILL network 600 that are not capable of encapsulating a frame with a standard TRILL header such as, for example, TRILL header 551 in FIG. 5. For example, in FIG. 6A, the hardware of edge router-bridges 610, 612, 614, 616 in FIG. 6A do not support the TRILL protocol. That is, the hardware of edge router-bridges 610, 612, 614, 616 in FIG. 6A are not capable of encapsulating a frame with a standard TRILL header such as, for example, TRILL header 551 in FIG. 5. Rather than use the TRILL nicknames for the ingress and egress router-bridges, the edge router-bridges add identifiers that are unique for each edge router bridge in the TRILL network 600 of FIG. 6A and supported by the hardware of those bridges. The ingress bridge has the ability to add these bridge identifiers to the frame because, although hardware of edge router-bridges 610, 612, 614, 616 in FIG. 6A cannot add a TRILL header to a frame, the edge router-bridge hardware does support certain headers required for creating a stacked-chassis or customized headers that allow these router-bridges to add the ingress and egress bridge identifiers to the frame 640.

In the example of FIG. 6A, T-ERB-1 610 retrieves its bridge identifier (T-ERB-1-BID) as the ingress bridge. T-ERB-1 610 then identifies the bridge identifier (T-ERB-8-BID) for the egress bridge node in dependence upon the destination node address specified by the frame. Each edge router-bridge maintains a table that maps customer MAC address to certain edge router-bridges in the TRILL network 600. Using such a table, T-ERB-1 610 determines that T-ERB-8 614 is the egress bridge for CE-31 630. T-ERB-1 610 then adds the bridge identifier (T-ERB-1-BID) for itself as the ingress bridge to the frame 640b and adds the bridge identifier (T-ERB-8-BID) for egress bridge T-ERB-8 614 to the frame 640b. T-ERB-1 610 then routes the frame 640b to the next router-bridge, CRB-5 604, on the path from itself to T-ERB-8 614.

CRB-5 604 of FIG. 6A receives the frame 640b from the ingress bridge T-ERB-1 610 and routes the frame 640 in dependence upon the ingress bridge identifier (T-ERB-1-BID) and the egress bridge identifier (T-ERB-8-BID) included in the frame 640b. In the example of FIG. 6A, CRB-5 604 routes the frame 640 by adding a standard TRILL header 654 based on the bridge identifiers for the ingress and egress edge bridges 610, 614, although the header could be any shortest path bridging header as will occur to those of skill in the art. The TRILL header 654 includes the ingress bridge nickname for the ingress bridge based on the ingress bridge identifier (T-ERB-8-BID) and the egress bridge nickname for the egress bridge based on the egress bridge identifier (T-ERB-8-BID). In fact, as mentioned above, the ingress and egress bridge nickname may be the same value as the ingress and egress bridge identifiers or the ingress and egress bridge nickname may be derived based on a mapping table from the ingress and egress bridge identifiers.

In the example of FIG. 6A, the ingress and the egress bridge nicknames conform to the TRILL protocol and are assigned to the router-bridges in the TRILL network 600 using a predetermined protocol such as, for example, a dynamic nickname acquisition protocol described in the "Rbridges: Base Protocol Specification" promulgated by the TRILL Working Group, which is affiliated with the Internet Engineering Task Force.

Upon adding the TRILL header 654 to the frame 640c, CRB-5 604 then routes the frame 640 to the egress bridge node in dependence upon the ingress bridge nickname and the egress bridge nickname. Specifically in FIG. 6A, CRB-5 604 identifies a MAC address for a next bridge in the network 600 that is on a path from CRB-5 604 to the T-ERB-8 614 based on the egress bridge nickname and adds the MAC address for the next bridge node to the frame 640c in an Ethernet MAC header 656 such as, for example, one similar to the header 552 in FIG. 5. CRB-5 604 then routes the frame 640c to the next bridge node, CRB-4 602 in dependence upon the MAC address in the MAC header 656.

In the example of FIG. 6A, CRB-4 602 receives the frame 640b from the CRB-5 604 for transmission to CE-31 630. Upon examining the information in the frame 640c, CRB-4 602 determines that the frame 640 traverses the egress bridge node T-ERB-8 614 on the next network hop. Because T-ERB-8 614 does not have the hardware to support TRILL header 654, CRB-4 602 replaces the TRILL header 654 with the ingress bridge identifier (T-ERB-1-BID) for the ingress bridge 610 and the egress bridge identifier (T-ERB-8-BID) for the egress bridge 614 and routes the frame 640d to the egress bridge node T-ERB-8 614. CRB-4 602 knows that egress bridge node T-ERB-8 614 lacks mac-in-mac encapsulation capabilities because those capabilities are broadcast to other nodes on the network 600 when egress bridge node T-ERB-8 614 initially joins the network 600.

The egress bridge node T-ERB-8 614 in FIG. 6A receives the frame 640d from CRB-4 602 for transmission to the destination node CE-31 630. Because customer networks 611, 613 of FIG. 6A are IEEE 802.1Q networks, T-ERB-8 614 removes the ingress bridge identifier (T-ERB-1-BID) and the egress bridge identifier (T-ERB-8-BID) from the frame 640d, leaving frame 640a. T-ERB-8 614 then routes the frame 640 for delivery to the destination node CE-31 630 through customer network 613.

Readers will note that in the example of FIG. 6A, the first core router-bridge that received the frame from the ingress bridge added a TRILL header to the frame. The core router-bridges then utilized the TRILL nicknames in the TRILL header to route the frame through the network to core bridge directly connected to the egress bridge by a single network hop. In such a manner, once the TRILL header has been added to the frame, the other core bridge-routers that route the frame using the TRILL header need not be configured for routing frames in a computer network using bridge identifiers according to embodiments of the present invention. Rather, these router-bridges may route the frame in the standard fashion provided by the TRILL protocol. Depending on the topology of the network, therefore, standard router-bridges may be utilized along with router-bridges modified to operate in accordance with embodiments of the present invention.

In some other embodiments, all of the router-bridges may be modified to operate in accordance with embodiments of the present invention. In such embodiments, the TRILL header need not be added to the frames by the core router-bridges. Rather, each core router-bridge may route the frame along the network using the ingress bridge identifier and egress bridge identifier alone without the need to generate a shortest path bridging header such as the TRILL header in FIG. 6A.

Figure 6B:
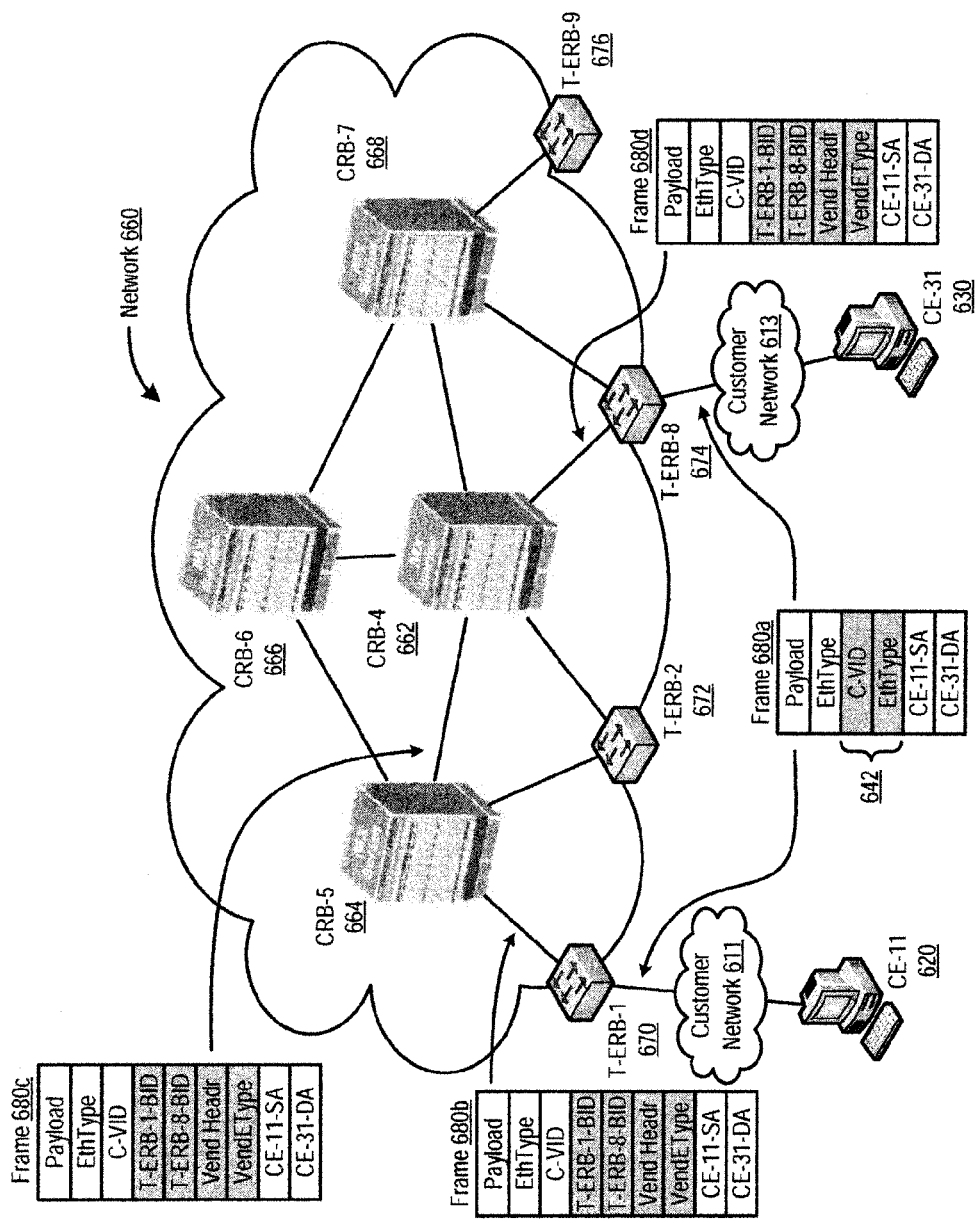
FIG. 6B sets forth a network diagram that illustrates a TRILL network having bridges that support routing frames in a computer network using bridge identifiers according to embodiments of the present invention.

For further explanation, FIG. 6B sets forth a network diagram that illustrates a network having bridges that support routing frames in a computer network using bridge identifiers according to embodiments of the present invention. The network of FIG. 6B includes four core router-bridges (CRB)—that is, CRB-4 662, CRB-5 664, CRB-6 666, and CRB-7 668—and four edge router-bridges implemented as top-of-rack devices (T-ERB)—that is, T-ERB-1 670, T-ERB-2 672, T-ERB-8 674, and T-ERB-9 676. In the example of FIG. 6B, the network 660 interconnects customer equipment (CE)-11 620 and CE-31 630. CE-11 620 connects to the network 660 through T-ERB-1 670, while CE-31 630 connects to the network 660 through T-ERB-8 674.

FIG. 6B illustrates frame 680 in various stages as the frame 680 traverses the networks of FIG. 6B. In FIG. 6B, the network administrator managing CE-11 620 and CE-31 630 has grouped CE-11 620 and CE-31 630 into a customer VLAN for data communications. Accordingly, frame 680 of FIG. 6B includes a customer VLAN header 642 that includes a customer VLAN identifier (C-VID) identifying the particular customer VLAN to which the CE-11 620 and CE-31 630 are assigned. The VLAN header 642 also includes a header type (EthType) specifying that the frame is an IEEE 802.1Q compliant frame. The frame 680a also includes a source MAC address (CE-11-SA) designating CE-11 620 as the originator of the frame 680a and a destination MAC address (CE-31-DA) designating CE-31 630 as the destination node to which the frame 680 is transmitted.

In the example of FIG. 6B, T-ERB-1 670 receives the frame 680a from CE-11 620 through customer network 611. T-ERB-1 670, along with other bridges in the network 660, utilizes bridge identifiers for the ingress bridge and the egress bridges to route the frame 680 through the network. As mentioned above, the bridge identifiers are identifiers unique to each of the bridges in the network 660. The bridge identifiers included in the frame 680 are generally part of a customized vender header established by the vender of the bridges used in the network 660. The bridges in a network 660 may negotiate unique bridge identifiers among themselves using any dynamic acquisition control protocol as will occur to those of skill in the art.

Using the bridge identifiers contained in a customized vender header to route frame through the network 660 allows the bridges to provide shortest path bridging for frames between customer networks 611 and 613 without the use of mac-in-mac encapsulation, a feature often not supported in the hardware of current bridge devices. Although hardware of edge router-bridges 670, 672, 674, 676 in FIG. 6B does not support mac-in-mac encapsulation, the edge router-bridge hardware does support certain stacked headers or customized headers that allows these router-bridges to add the ingress and egress bridge identifiers to the frame 680.

In the example of FIG. 6B, T-ERB-1 670 retrieves its bridge identifier (T-ERB-1-BID) as the ingress bridge. T-ERB-1 670 then identifies the bridge identifier (T-ERB-8-BID) for the egress bridge node in dependence upon the destination node address specified by the frame. Each edge router-bridge maintains a table that maps customer MAC address to certain edge router-bridges in the Network 660. Using such a table, T-ERB-1 670 determines that T-ERB-8 674 is the egress bridge for CE-31 630. T-ERB-1 670 then adds the bridge identifier (T-ERB-1-BID) for itself as the ingress bridge to the frame 680b and adds the bridge identifier (T-ERB-8-BID) for egress bridge T-ERB-8 674 to the frame 680b. T-ERB-1 670 then routes the frame 680b to the next router-bridge, CRB-5 664, on the path from itself to T-ERB-8 674.

CRB-5 664 of FIG. 6B receives the frame 680b from the ingress bridge T-ERB-1 670 and routes the frame 680 in dependence upon the ingress bridge identifier (T-ERB-1-BID) and the egress bridge identifier (T-ERB-8-BID) included in the frame 680b. In the example of FIG. 6B, CRB-5 664 routes the frame 680 by determining the next bridge in the network that is on the path to the egress bridge and forwarding the frame to the next bridge. CRB-5 664 may determine the next bridge in the network that is on the path to the egress bridge using forwarding tables as will occur to those of ordinary skill in the art. Similarly, when CRB-4 662 receives the frame 680c from CRB-5 664, CRB-4 662 routes the frame 680c to egress bridge node T-ERB-8 674.

The egress bridge node T-ERB-8 674 in FIG. 6B receives the frame 680d from CRB-4 662 for transmission to the destination node CE-31 630. Because customer networks 611, 613 of FIG. 6B are IEEE 802.1Q networks, T-ERB-8 674 removes the ingress bridge identifier (T-ERB-1-BID) and the egress bridge identifier (T-ERB-8-BID) from the frame 680d, leaving frame 680a. T-ERB-8 674 then routes the frame 680 for delivery to the destination node CE-31 630 through customer network 613.

Figure 7:
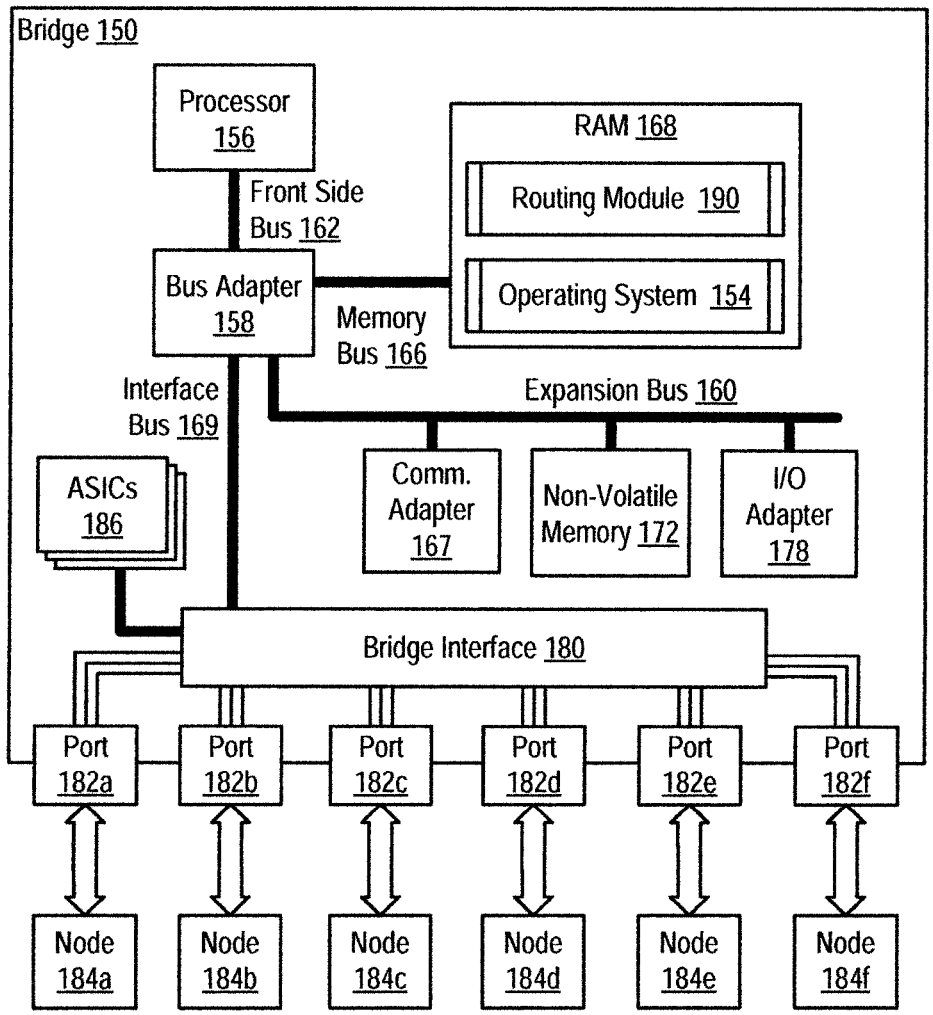
FIG. 7 sets forth a block diagram of automated computing machinery comprising an exemplary bridge useful in routing frames in a computer network using bridge identifiers according to embodiments of the present invention.

Routing frames in a computer network using bridge identifiers according to embodiments of the present invention is implemented generally with computers, that is, automated computing machinery. For further explanation, therefore, FIG. 7 sets forth a block diagram of automated computing machinery comprising an exemplary bridge 150 useful in routing frames in a computer network using bridge identifiers according to embodiments of the present invention. The bridge 150 of FIG. 7 is one of a plurality of bridge nodes included in the computer network. At least one of the bridge nodes in the network operates as an ingress bridge node through which the frames are received into the computer network. Also, at least one of the bridge nodes in the network operates as an egress bridge node through which the frames are transmitted out of the computer network.

In the example of FIG. 7, the exemplary bridge 150 includes at least one processor 156 or 'CPU' as well as random access memory 168 (RAM) which is connected through a high speed memory bus 166 and bus adapter 158 to the processor 156 and to other components of the exemplary bridge 150.

Stored in RAM 168 of FIG. 7 is a routing module 190. The routing module 190 of FIG. 7 is computer program instructions for routing frames in a computer network using bridge identifiers according to embodiments of the present invention. The routing module 190 of FIG. 7 operates generally for routing frames in a computer network using bridge identifiers according to embodiments of the present invention depending on the particular location of the bridge 150 in the network topology. For example, the bridge 150 may operate in the network topology as an ingress bridge, a core bridge, or an egress bridge. An ingress bridge is a bridge through which a frame enters the computer network from another network. An egress bridge is a bridge through which the frame is transmitted out of the network into another network. A core bridge is a bridge in the computer network that routes frames between edge bridges—that is, between ingress bridges and egress bridges.

When the bridge 150 operates as an ingress bridge for the network, the routing module 190 of FIG. 7 operates generally for routing frames in a computer network using bridge identifiers according to embodiments of the present invention by: receiving, from a source node connected to the bridge 150 through another computer network, a frame that specifies a source node address for the source node originating the frame and a destination node address for a destination node to which the frame is transmitted; retrieving an ingress bridge identifier for the ingress bridge node; identifying an egress bridge identifier for the egress bridge node in dependence upon the destination node address specified by the frame; adding the ingress bridge identifier and the egress bridge identifier to the frame; and routing the frame through the computer network to the egress bridge node through which the destination node connects to the network.

When the bridge 150 operates as a core bridge that receive the frame from an ingress bridge, the routing module 190 of FIG. 7 operates generally for routing frames in a computer network using bridge identifiers according to embodiments of the present invention by: receiving, from the ingress bridge node, a frame for transmission to a destination node connected to the network through the egress bridge node, the frame including an ingress bridge identifier and an egress bridge identifier; and routing, to the egress bridge node, the frame in dependence upon the ingress bridge identifier and the egress bridge identifier included in the frame.

When the bridge 150 operates as a core bridge according to a shortest path bridging protocol that is connected to the egress bridge by a single network hop, the routing module 190 of FIG. 7 may operate generally for routing frames in a computer network using bridge identifiers according to embodiments of the present invention by: receiving a frame for transmission to a destination node connected to the network through the egress bridge node, the frame having a shortest path bridging header that includes an ingress bridge nickname and an egress bridge nickname; determining that the frame traverses the egress bridge node on the next network hop; replacing, in response to the determination, the shortest path bridging header with an ingress bridge identifier and an egress bridge identifier; and routing the frame to the egress bridge node.

When the bridge 150 operates as an egress bridge for the network, the routing module 190 of FIG. 7 operates generally for routing frames in a computer network using bridge identifiers according to embodiments of the present invention by: receiving, from one of the bridge nodes in the network, a frame for transmission to a destination node connected to the network through the egress bridge node, the frame including an ingress bridge identifier and an egress bridge identifier; removing the ingress bridge identifier and the egress bridge identifier from the frame; and routing the frame for delivery to the destination node.

Also stored in RAM 168 is an operating system 154. Operating systems useful in bridges according to embodiments of the present invention may include Juniper Networks' JUNOS® and JUNOSe®, Cisco's IOS®, or Extreme Networks' ExtremeXOS®. Other operating systems that may be useful in bridges according to embodiments of the present invention may include lightweight versions of UNIX™, Linux™, Microsoft XP™, and others as will occur to those of skill in the art. Operating system 154 and routing module 190 in the example of FIG. 7 are shown in RAM 168, but many components of such software typically are stored in non-volatile memory 172 also, for example, Electrically Erasable Programmable Read-Only Memory (EEPROM) or in memory of the application-specific integrated circuits (ASICs) 186.

The bridge 150 of FIG. 7 includes a bridge interface 180 connected to the other component of the bridge 150 through the bus adapter 158. The bridge interface 180 provides ports 182 through which nodes 184 connected to the bridge 150. The nodes 184 may be implemented as servers, workstations, network devices, or any other computing device as will occur to those of skill in the art. The bridge interface 180 of FIG. 7 includes switching circuitry controlled by the processor 156 or ASICs 186. The switching circuitry of the bridge interface 180 provides high-speed switching services to rapidly receive frames on one port and forward those frames on to their ultimate destination through another port. The switching circuitry may also provided limited processing capabilities offloaded from the ASICs 186 or the processor 156.

In the example of FIG. 7, the ASICs 186 connected to the bridge interface 180 provide certain frame processing services in an effort to offload processing from the main processor 156. For example, the ASICs 186 may be used to provide filtering, replication, forwarding, encapsulation, or de-encapsulation services. Even still, the ASICs 186 may contain and execute the routing module 190 as described above.

The exemplary bridge 150 of FIG. 7 includes a bus adapter 158, a computer hardware component that contains drive electronics for the high speed buses, the front side bus 162 and the memory bus 166, as well as drive electronics for the interface bus 169 and the slower expansion bus 160. Through the expansion bus 160 of FIG. 7, the communications adapter 167, non-volatile memory 172, and I/O adapter 178 are connected to the other components of the exemplary bridge 150.

The exemplary bridge 150 of FIG. 7 includes one or more input/output ('I/O') adapters 178. I/O adapters 178 provide components that allow the processor 156 to interface with various I/O components of the bridge. Exemplary I/O components may include, for example, light-emitting diodes (LEDs), liquid-crystal displays (LCDs), physical switches and buttons, or other interface components as will occur to those of skill in the art.

The exemplary bridge 150 of FIG. 7 also includes a communications adapter 167 for data communications with other computing devices out of band from the network communications through ports 182. The communications adapter 167 may provide the processor 156 with a interface according to the Universal Serial Bus (USB) specification, Small Computer System Interface (SCSI) specification, RS-232 specification, Inter-Integrated Circuit ($I^2C$) bus protocol, a System Management Bus (SMBus) protocol, an Intelligent Platform Management Bus (IPMB) protocol, or the like.

Readers will note that the exemplary implementation of the bridge 150 of FIG. 7 is for explanation only and not for limitation. Other computing architectures as will occur to those of skill in the art may also be useful for routing frames in a provider network using bridge identifiers according to embodiments of the present invention. For example, the bridge may be implemented using a general-purpose computer or a specialized computing device dedicated for network frame processing, or other hybrid architectures.

Figure 8:
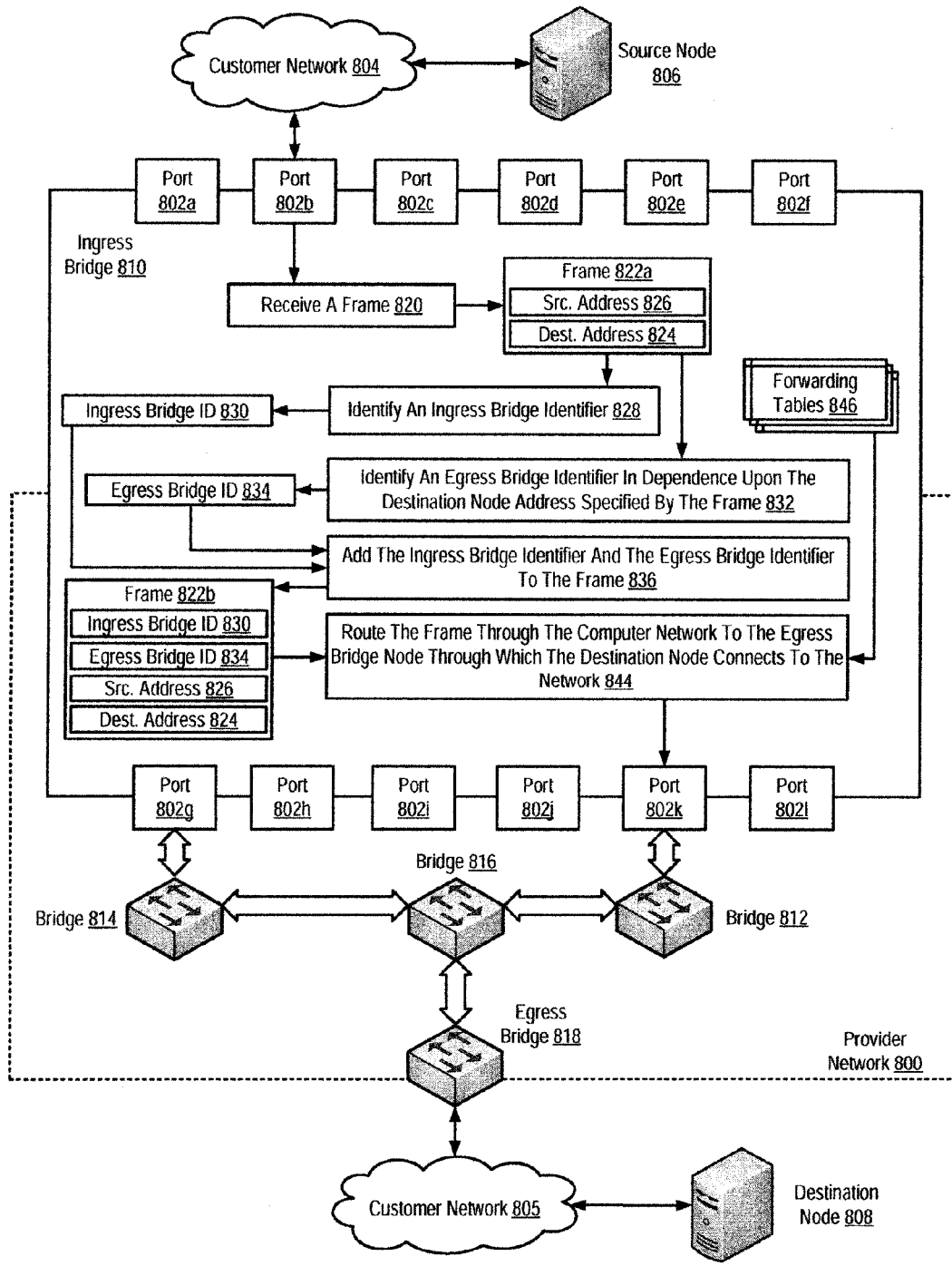
FIG. 8 sets forth a diagram illustrating an exemplary method of routing frames in a provider network using bridge identifiers according to embodiments of the present invention.
Figure 9:
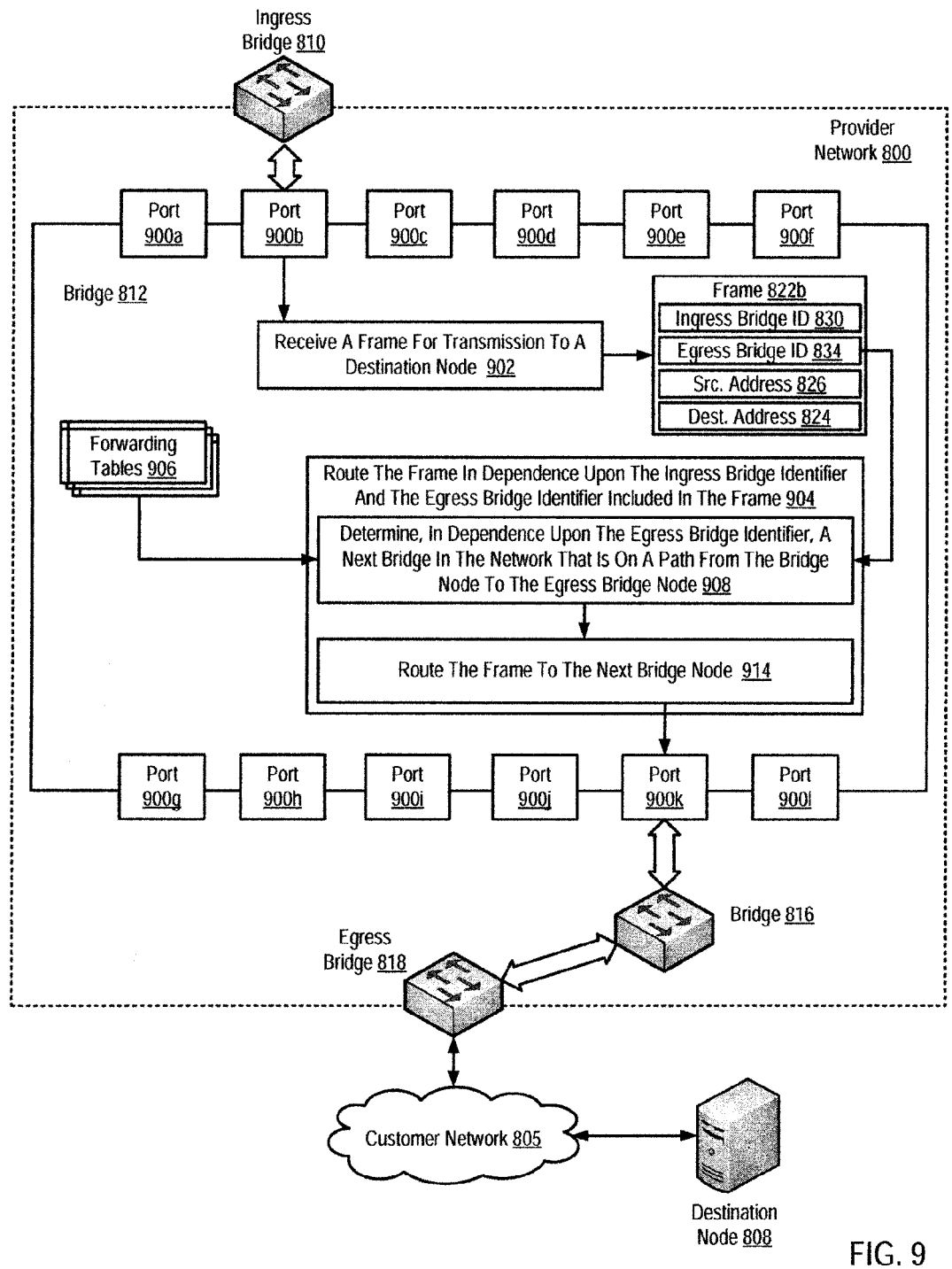
FIG. 9 sets forth a diagram illustrating a further exemplary method of routing frames in a provider network using bridge identifiers according to embodiments of the present invention.
Figure 10:
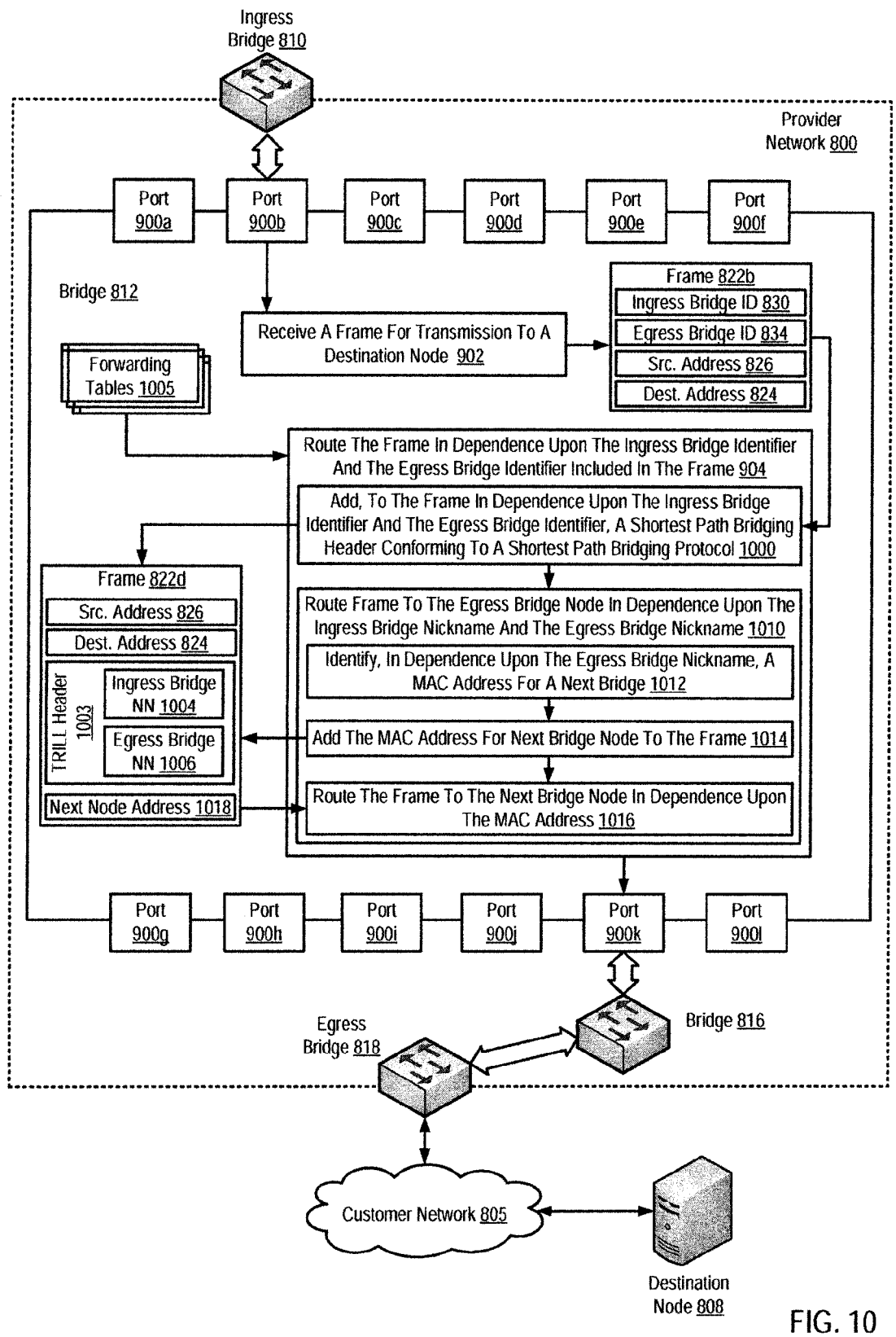
FIG. 10 sets forth a diagram illustrating a further exemplary method of routing frames in a provider network using bridge identifiers according to embodiments of the present invention.
Figure 11:
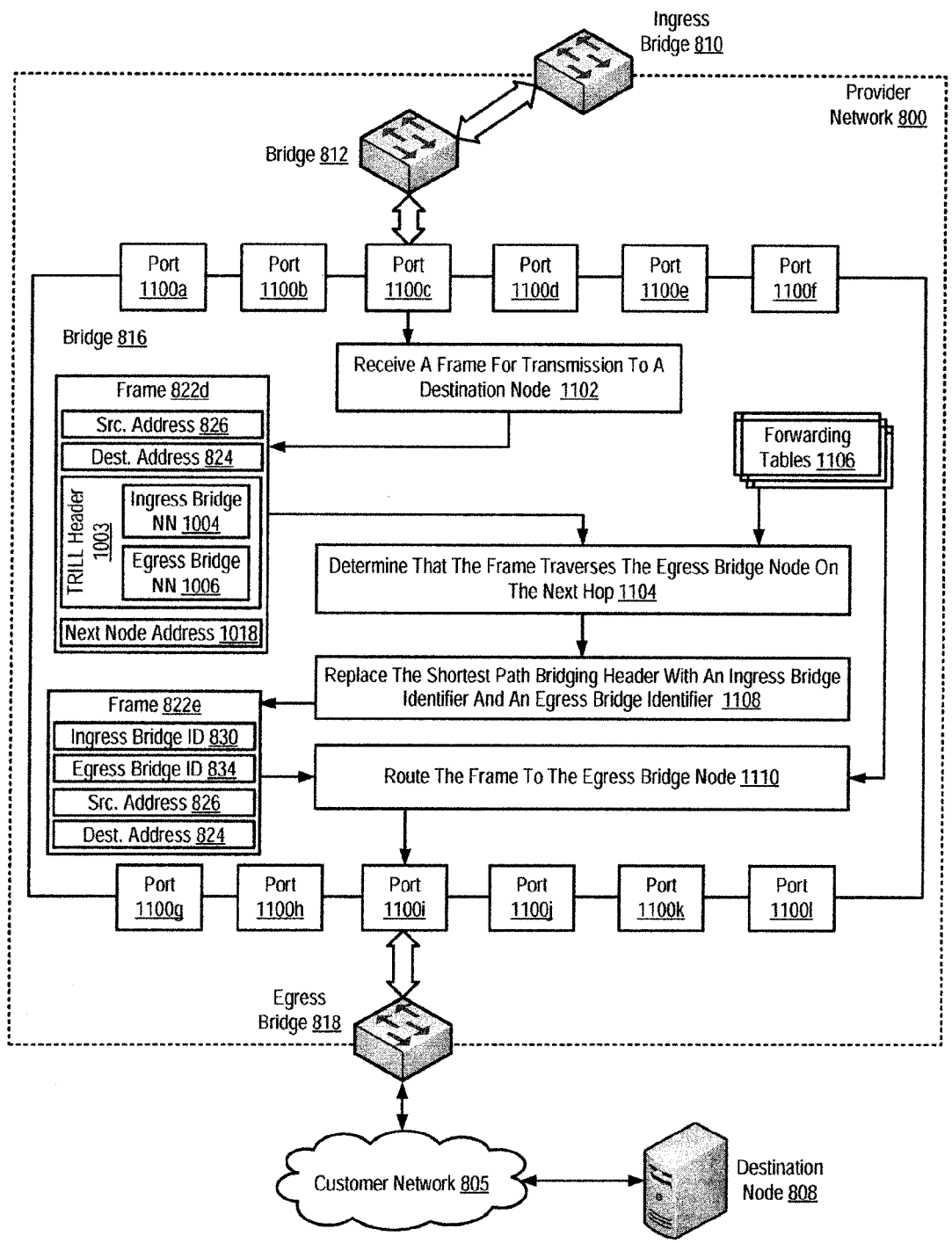
FIG. 11 sets forth a diagram illustrating a further exemplary method of routing frames in a provider network using bridge identifiers according to embodiments of the present invention.
Figure 12:
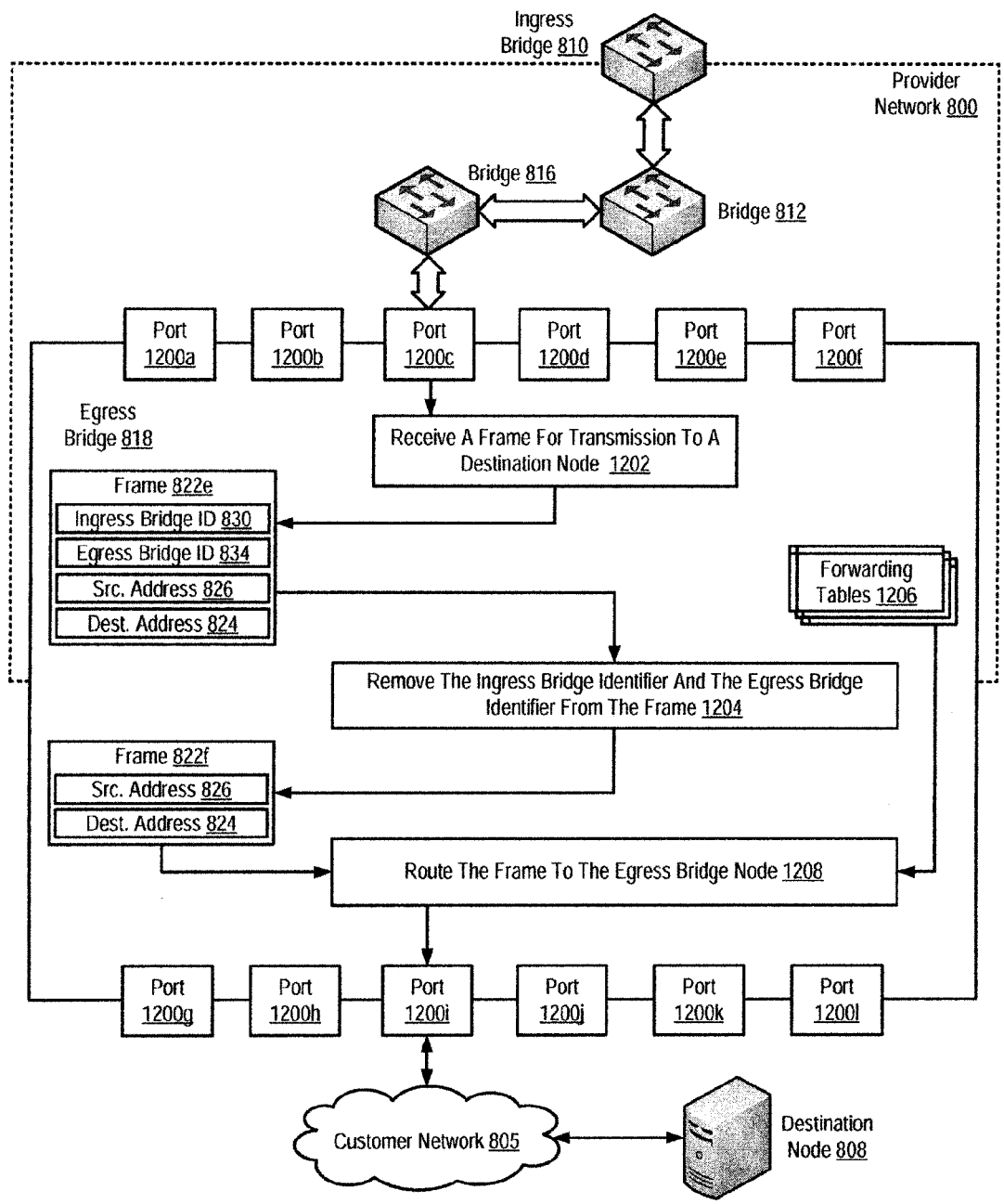
FIG. 12 sets forth a diagram illustrating a further exemplary method of routing frames in a provider network using bridge identifiers according to embodiments of the present invention.

FIGS. 8-12 provide further explanation of various embodiments of the present invention as different bridges operating according to embodiments of the present invention route a frame through a provider network. FIGS. 8-12 illustrate the methods carried out by various bridges operating according to embodiments of the present invention as a frame traverse through a computer network. FIG. 8 describes the methods performed by an ingress bridge node in the computer network. FIGS. 9, 10, and 11 describe method performed by core bridge nodes in the computer network. FIG. 12 describes the methods performed by an egress bridge node in the computer network.

As mentioned above, FIG. 8 sets forth a flow chart illustrating an exemplary method of routing frames in a provider network 800 using bridge identifiers according to embodiments of the present invention. The provider network 800 of FIG. 8 includes a plurality of bridge nodes 810, 812, 814, 816, 818. In FIG. 8, bridge node 810 operates as an ingress bridge node through which the frames are received into the provider network 800, and bridge node 818 operates as an egress bridge node through which the frames are transmitted out of the provider network 800. In the example of FIG. 8, the hardware of the ingress bridge node 810 and hardware of the egress bridge node 808 do not support MAC-in-MAC encapsulation, and thus are unable to support the TRILL protocol at the hardware level.

The ingress bridge node 810 of FIG. 8 includes twelve ports 802a-l through which other nodes may connect to the ingress bridge node 810. In the example of FIG. 8, a source node 806 connects to the ingress bridge node 810 through port 802b and customer network 804. Core bridge node 812 connects to the ingress bridge node 810 through port 802k. Core bridge node 814 connects to the ingress bridge node 810 through port 802g.

The method of FIG. 8 includes receiving 820 a frame 822 by the ingress bridge node 810 from the source node 806. The frame 822a of FIG. 8 specifies a source node address 826 for the source node 806 originating the frame 822a and a destination node address 824 for a destination node 808 to which the frame 822 is transmitted. The source and destination node addresses 826, 824 may be implemented as MAC addresses. The ingress bridge node 810 may receive 820 a frame 822 from the source node 806 according to the method of FIG. 8 by retrieving the frame 822a from a reception stack for port 802b and advancing the stack pointer for the reception stack. The reception stack may be implemented as a buffer into which frames received from a port 802 are placed until those frames are processed by the bridge.

The method of FIG. 8 also includes identifying 828, by the ingress bridge node 810, an ingress bridge identifier 830 for the ingress bridge node 810. The bridge identifiers are identifiers unique to each of the bridges in the network 800. Typically, the bridges in the network 800 negotiate among one another the values that each bridge will use as its bridge identifier using any dynamic acquisition control protocol as will occur to those of skill in the art. The values for the bridge identifiers are then shared among all of the bridges in the network as part of the dynamic acquisition protocol or through some other communications means as will occur to those of skill in the art.

The method of FIG. 8 includes identifying 832, by the ingress bridge node 810, an egress bridge identifier 834 for the egress bridge node 818 in dependence upon the destination node address 826 specified by the frame 822. The ingress bridge node 810 may identify 832 an egress bridge identifier 834 according to the method of FIG. 8 using a lookup table (not shown) to determine the egress bridge identifier associated with the destination node address 826. Such a lookup table may be implemented by those of skill in the art. The lookup table may be populated as the edge bridges 810, 818 of the provider network 800 learn and share the MAC address of the devices connected to their respective customer networks 804, 805.

The method of FIG. 8 then includes adding 836, by the ingress bridge node 810, the ingress bridge identifier 830 and the egress bridge identifier 834 to the frame, resulting in the frame 822b illustrated in FIG. 8. The ingress bridge node 810 may add 836 the ingress bridge identifier 830 and the egress bridge identifier 834 to the frame 822 according to the method of FIG. 8 by adding a customized vender header to the frame 822 that includes the bridge identifiers 830, 834. Although the hardware of the ingress and egress bridges of FIG. 8 do not support MAC-in-MAC encapsulation, the hardware does support stacked headers and certain customized vender headers that enable the ingress bridge to add the bridge identifiers 830, 834 to the frame 822b.

The method of FIG. 8 includes routing 844, by the ingress bridge node 810, the frame 822b through the provider network 800 to the egress bridge node 818 through which the destination node 808 connects to the network 800. The ingress bridge node 810 may route 844 the frame 822b according to the method of FIG. 8 by determining the next bridge along the path from the ingress bridge node to the egress bridge node using forwarding tables 846, the implementation of which will be well-know to those of skill in the art. The ingress bridge node 810 may further route 844 the frame 822b according to the method of FIG. 8 by storing the frame 822 in the transmission stack for the port 802 corresponding the next bridge. The ingress bridge node 810 may identify the particular port 802 that corresponds to the next bridge using the forwarding tables 846, which associates other bridges in the network 800 with various ports 802 of the ingress bridge 810. Once the frame 822 is placed in the transmission stack for a port 802, the bridge interface, such the bridge interface described with reference to FIG. 7, sends the frame 822 out from the appropriate port 802 to the next bridge—that is, bridge 812.

For further explanation of the frame processing that takes place at core bridge 812, FIG. 9 sets forth a flow chart illustrating a further exemplary method of routing frames in a provider network 800 using bridge identifiers according to embodiments of the present invention. The network topology of FIG. 9 is similar to the FIG. 8. The provider network 800 of FIG. 9 includes a plurality of bridge nodes 810, 812, 816, 818. In FIG. 9, bridge node 810 operates as an ingress bridge node through which the frames are received into the provider network 800, and bridge node 818 operates as an egress bridge node through which the frames are transmitted out of the provider network 800. The bridge nodes 812, 816 of FIG. 9 operate as core bridges. In the example of FIG. 9, the hardware of the ingress bridge node 810 and hardware of the egress bridge node 808 do not support MAC-in-MAC encapsulation, and thus are unable to support the TRILL protocol.

The bridge node 812 of FIG. 9 includes twelve ports 900a-l through which other nodes may connect to the bridge node 812. In the example of FIG. 9, the ingress bridge node 810 connects to the bridge node 812 through port 900b. Core bridge node 816 connects to the bridge node 812 through port 900k.

The method of FIG. 9 includes receiving 902, by the bridge node 812 from the ingress bridge node 810, a frame 822 for transmission to a destination node 808. In the example of FIG. 9, the destination node 808 connects to the provider network 800 through customer network 805 and the egress bridge node 818. The frame 822 of FIG. 9 includes an ingress bridge identifier 830 and an egress bridge identifier 834. The bridge node 812 may receive 902 the frame 822 from the ingress bridge node 810 according to the method of FIG. 9 by retrieving the frame 822b from a reception stack for port 900b and advancing the stack pointer for the reception stack.

The method of FIG. 9 also includes routing 904, by the bridge node 812 to the egress bridge node 818 through which the destination node 808 connects to the network 800, the frame 822 in dependence upon the ingress bridge identifier 830 and the egress bridge identifier 834 included in the frame 822. The bridge node 812 routes 904 the frame 822 to the egress bridge node 818 according to the method of FIG. 9 by determining 908 the next bridge 816 in the network 800 along the path to the egress bridge node 818 using the egress bridge identifier 834. The egress bridge identifier 834 may determine 908 the next bridge 816 according to the method of FIG. 9 by identifying the bridge associated with the egress bridge identifier 834 in a forwarding table 906. The forwarding tables 906 of FIG. 9 associate ports having links to bridges adjacent to the bridge 812 in the network topology with bridge identifiers for other bridges in the network. In such a manner, the forwarding tables 906 specify by port the next bridge along the path to any bridge in the network 800 from the bridge 812.

The bridge node 812 then routes 904 the frame 822 to the egress bridge node 818 according to the method of FIG. 9 by storing the frame 822c in a transmission stack for the port identified in the forwarding table 906 with egress bridge identifier. Once the frame 822 is placed in the transmission stack for the identified port, the bridge interface, such the bridge interface described with reference to FIG. 7, sends the frame 822 out from the appropriate port 802 to the next bridge—that is, bridge 816—on the shortest path to the egress bridge node 818.

Readers will note that in FIG. 9, the core bridges does not utilize a special shortest path bridging protocol header, such as TRILL header, to route the frame through the provider network. Rather, the core bridges route the frame through the network based on the ingress and egress bridge identifiers encapsulated in the frame using a customized vender header or stacked header. In some other embodiments, however, the core bridges may convert ingress and egress bridge identifiers into a TRILL header and then route the frame through the network based on TRILL nicknames in the TRILL header.

For further explanation of the use of a shortest path bridging header, and specifically a TRILL header, in routing the frames through a computer network, consider FIG. 10. FIG. 10 sets forth a flow chart illustrating a further exemplary method of routing frames in a provider network 800 using bridge identifiers according to embodiments of the present invention. The bridge 812 of FIG. 10 is the same as the bridge in FIG. 9, and the network topology of FIG. 10 is the same as FIG. 9. That is, the provider network 800 of FIG. 10 includes a plurality of bridge nodes 810, 812, 816, 818. In FIG. 10, bridge node 810 operates as an ingress bridge node through which the frames are received into the provider network 800, and bridge node 818 operates as an egress bridge node through which the frames are transmitted out of the provider network 800. The bridge nodes 812, 816 of FIG. 10 operate as core bridges. In the example of FIG. 10, the hardware of the ingress bridge node 810 and hardware of the egress bridge node 818 do not support MAC-in-MAC encapsulation, and thus are unable to support the TRILL protocol.

The bridge node 812 of FIG. 10 includes twelve ports 900a-l through which other nodes may connect to the bridge node 812. In the example of FIG. 10, the ingress bridge node 810 connects to the bridge node 812 through port 900b. Core bridge node 816 connects to the bridge node 812 through port 900k.

The method of FIG. 10 includes receiving 902, by the bridge node 812 from the ingress bridge node 810, a frame 822 for transmission to a destination node 808. The destination node 808 connects to the provider network 800 through the egress bridge node 818 and customer network 805. The frame 822b includes an ingress bridge identifier 830 and an egress bridge identifier 834. The bridge node 812 may receive 902 a frame 822 from the ingress bridge node 810 according to the method of FIG. 10 by retrieving the frame 822b from a reception stack for port 900b and advancing the stack pointer for the reception stack.

The method of FIG. 10 also includes routing 904, by the bridge node 812 to the egress bridge node 818 through which the destination node 808 connects to the network 800, the frame 822 in dependence upon the ingress bridge identifier 830 and the egress bridge identifier 834 included in the frame 822b. In the method of FIG. 10, the bridge node 812 routes 904 the frame 822 to the egress bridge node 818 using the TRILL routing protocol. Because the TRILL protocol utilizes nicknames for the ingress and egress bridge nodes to route the frame, the bridge 812 routes 904 the frame 822 according to the method of FIG. 10 by adding 1000, to the frame 822d in dependence upon the ingress bridge identifier 830 and the egress bridge identifier 834, a TRILL header 1003 conforming to the TRILL protocol. The TRILL header 1003 of FIG. 10 includes an ingress bridge nickname 1004 and an egress bridge nickname 1006. As mentioned above, the ingress bridge nickname 1004 and the egress bridge nickname 1006 may be implemented using the same values as the ingress bridge identifier 830 and the egress bridge identifier 834, respectively, to avoid the extra step of converting the bridge identifiers 830 and 834 into nicknames 1004 and 1006 using a table. However, in some embodiments, the ingress and egress bridge nickname may be derived based on a mapping table from the ingress and egress bridge identifiers.

After adding 1000 the TRILL header 1003 to the frame 882d, the method of FIG. 10 further includes routing 1010 the frame 822 to the egress bridge node 818 in dependence upon the ingress bridge nickname 1004 and the egress bridge nickname 1006 included in the TRILL header 1003. The bridge node 812 may route 1010 the frame 822 to the egress bridge node 818 according to the method of FIG. 10 by identifying 1012, in dependence upon the egress bridge nickname 1006, a MAC address 1018 for a next bridge 816 in the network that is on a path from the bridge node 812 to the egress bridge node 818. The bridge node 812 may identify 1012 the next bridge 816 in the network 800 and its MAC address 1018 using forwarding tables 1005, which may be implemented in any manner as will occur to those of skill in the art and associate MAC addresses for adjacent bridge nodes with the other bridges in the network 800. The bridge node 812 may further route 1010 the frame 822 according to the method of FIG. 10 by adding 1014 the MAC address 1018 for the next bridge node 816 to the frame 822 and routing 1016 the frame 822 to the next bridge node 816 using the MAC address 1018.

For further explanation of the frame processing that takes place at core bridge 816, FIG. 11 sets forth a flow chart illustrating a further exemplary method of routing frames in a provider network 800 using bridge identifiers according to embodiments of the present invention. The network topology of FIG. 11 is similar to the topology in FIGS. 8-10. The provider network 800 of FIG. 11 includes a plurality of bridge nodes 810, 812, 816, 818. In FIG. 11, bridge node 810 operates as an ingress bridge node through which the frames are received into the provider network 800, and bridge node 818 operates as an egress bridge node through which the frames are transmitted out of the provider network 800. The bridge nodes 812, 816 of FIG. 11 operate as core bridges. In the example of FIG. 11, the hardware of the ingress bridge node 810 and hardware of the egress bridge node 808 do not support MAC-in-MAC encapsulation, and thus are unable to support the TRILL protocol.

The bridge node 816 of FIG. 11 includes twelve ports 1100a-l through which other nodes may connect to the bridge node 816. In the example of FIG. 11, the core bridge node 812 connects to the bridge node 816 through port 1100c. Egress bridge node 818 connects to the bridge node 816 through port 1100i.

The method of FIG. 11 includes receiving 1102, by bridge node 816, a frame 822 for transmission to a destination node 808. The destination node 808 of FIG. 11 connects to the network 800 through the egress bridge node 818 and customer network 805. The frame 822 has a TRILL header 1003 that includes an ingress bridge nickname 1004 and an egress bridge nickname 1006 and the MAC address 1018 of the bridge node 816—all similar to those described above with reference to FIG. 10. The bridge node 816 may receive 1102 the frame 822d according to the method of FIG. 11 by retrieving the frame 822d from a reception stack for port 1100c and advancing the stack pointer for the reception stack. The reception stack may be implemented as a buffer into which frames received from a port 1100 are placed until those frames are processed by the bridge 816.

The method of FIG. 11 includes determining 1104, by the bridge node 816, that the frame 822 traverses the egress bridge node 816 on the next network hop. In the method of FIG. 11, the bridge node 816 may determine 1104 that the frame 822 traverses the egress bridge node 816 on the next network hop using network topology data (not shown), which may be obtained and implemented in a manner as will occur to those of skill in the art, particularly through a dynamic control protocol that periodically detects changes in the network topology.

As previously mentioned, egress bridge 818 does not support MAC-in-MAC encapsulation. Thus, the method of FIG. 11 includes replacing 1108, by the bridge node 816 in response to the determination, the TRILL header 1003 with ingress bridge identifier 830 and the egress bridge identifier 834. The bridge node 816 may replace 1108 the TRILL header 1003 with ingress bridge identifier 830 and the egress bridge identifier 834 according to the method of FIG. 11 by removing the TRILL header 1003 and adding a vender header to the frame 822e that includes ingress bridge identifier 830 and the egress bridge identifier 834, each have the same value as the ingress bridge nickname 1004 and the egress bridge nickname 1006 respectively.

The method of FIG. 11 includes routing 1110, by the bridge node 816, the frame 822 to the egress bridge node 816. The bridge node 816 may route 1110 the frame 822 to the egress bridge node 816 according to the method of FIG. 11 by storing the frame 822 in the transmission stack for the port 1100i corresponding the next bridge 818. Once the frame 822 is placed in the transmission stack for a port 1100i, the bridge interface, such the bridge interface described with reference to FIG. 7, sends the frame 822 out from the appropriate port 1100i to the next bridge 818.

For further explanation of the frame processing that takes place at bridge 818, FIG. 12 sets forth a flow chart illustrating a further exemplary method of routing frames in a provider network 800 using bridge identifiers according to embodiments of the present invention. The network topology of FIG. 12 is similar to the FIGS. 8-11. The provider network 800 of FIG. 12 includes a plurality of bridge nodes 810, 812, 816, 818. In FIG. 12, bridge node 810 operates as an ingress bridge node through which the frames are received into the provider network 800, and bridge node 818 operates as an egress bridge node through which the frames are transmitted out of the provider network 800. The bridge nodes 812, 816 of FIG. 12 operate as core bridges. In the example of FIG. 12, the hardware of the ingress bridge node 810 and hardware of the egress bridge node 808 do not support MAC-in-MAC encapsulation, and thus are unable to support the TRILL protocol.

The bridge node 818 of FIG. 12 includes twelve ports 1200a-l through which other nodes may connect to the bridge node 818. In the example of FIG. 12, the core bridge node 812 connects to the bridge node 818 through port 1200c. The destination node 808 connects to the bridge node 818 through port 1200i and customer network 805.

The method of FIG. 12 includes receiving 1202, by the egress bridge node 818 from the bridge node 816, a frame 822e for transmission to a destination node 808. The destination node 808 connects to the network 800 through the egress bridge node 818. The frame 822 includes an ingress bridge identifier 830 and an egress bridge identifier 834. The egress bridge node 818 may receive 1202 according to the method of FIG. 12 by retrieving the frame 822e from a reception stack for port 1200c and advancing the stack pointer for the reception stack.

Readers will recall from above that the ingress and egress bridge identifiers 830, 834 are part of a customized or stacked vender header that does not conform with IEEE 802.1Q. Because the customer network of FIG. 12 is a IEEE 802.1Q compliant network, the method of FIG. 12 includes removing 1204, by the egress bridge node 818, the ingress bridge identifier 830 and the egress bridge identifier 834 from the frame 822 before sending the frame 822 to the destination node 808. The egress bridge node 818 may remove 1204 the ingress and egress bridge identifiers 830, 834 from the frame 822 according to the method of FIG. 12 by de-encapsulating the header from the frame 822 that contains the ingress and egress bridge identifiers 830, 834.

The method of FIG. 12 also includes routing 1208, by the egress bridge node 818, the frame 822 for delivery to the destination node 808. The egress bridge node 818 routes 1208 the frame 822 for delivery to the destination node 808 according to the method of FIG. 12 by identifying the port 1200i for which frames from the destination node 808 have previously been received using forwarding tables 1206 and storing the frame 822 in the transmission stack for the port 1200i corresponding the next device along the path to the destination node 808. Once the frame 822 is placed in the transmission stack for a port 1200i, the bridge interface, such the bridge interface described with reference to FIG. 7, sends the frame 822 out from the appropriate port 1200i.

Exemplary embodiments of the present invention are described largely in the context of a fully functional network bridges configured for routing frames in a computer network using bridge identifiers. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of routing frames in a computer network that uses media access control (MAC)-in-MAC encapsulation using bridge identifiers, the computer network including a plurality of bridge nodes, at least one of the plurality of bridge nodes operating as an ingress bridge node through which the frames are received into the computer network, and at least one of the plurality of bridge nodes operating as an egress bridge node through which the frames are transmitted out of the computer network, the method comprising the steps of:
   receiving, by one of the plurality of bridge nodes from the ingress bridge node, a frame including an ingress bridge identifier and an egress bridge identifier that does not have MAC-in-MAC encapsulation for transmission to a destination node, wherein the destination node is connected to the network through the egress bridge node;
   replacing, by the bridge node, the ingress bridge identifier and the egress bridge identifier of the frame with a shortest path bridging header; and
   routing, by the bridge node, the frame including the shortest path bridging header along a path toward the egress bridge node based on the shortest path bridging header included in the frame.

2. The method of claim 1 wherein the frame received by the bridge node from the ingress bridge node further comprises a vender header specified by a vender of the ingress bridge node, the vender header including the ingress bridge identifier and the egress bridge identifier.

3. The method of claim 1 wherein the shortest path bridging header conforms to a shortest path bridging protocol, and wherein the shortest path bridging header includes an ingress bridge nickname and an egress bridge nickname based on the ingress bridge identifier and the egress bridge identifier, the ingress bridge nickname allocated to the ingress bridge node according to a predetermined protocol, and the egress bridge nickname allocated to the egress bridge node according to the predetermined protocol.

4. The method of claim 3 wherein the step of routing the frame to the egress bridge node based on the shortest path bridging header further comprises the steps of:
   identifying, based on the egress bridge nickname included in the shortest path bridging header, a MAC address for a next bridge in the network that is on the path from the bridge node to the egress bridge node;
   adding the MAC address for the next bridge node to the frame; and
   routing the frame to the next bridge node based on the MAC address.

5. The method of claim 1 wherein the bridge node supports a Transparent Interconnection of Lots of Links ('TRILL') protocol and the shortest path bridging header conforms to the TRILL protocol.

6. The method of claim 1 wherein the step of routing the frame further comprises the steps of:
   determining, based on the shortest path bridging header, a next bridge in the network that is on the path from the bridge node to the egress bridge node; and
   routing the frame to the next bridge node.

7. The method of claim 1 wherein the bridge node is a core bridge node located on the path between the ingress bridge node and the egress bridge node.

8. The method of claim 1 wherein the ingress bridge node adds the ingress bridge identifier and the egress bridge identifier to the frame prior to routing the frame to the bridge node based on the ingress bridge identifier and the egress bridge identifier.

9. The method of claim 1 wherein hardware of the ingress bridge node and hardware of the egress bridge node are incapable of supporting MAC-in-MAC encapsulation.

10. A method of routing frames in a computer network that uses media access control (MAC)-in-MAC encapsulation using bridge identifiers, the computer network including a plurality of bridge nodes, at least one of the plurality of bridge nodes operating as an ingress bridge node through which the frames are received into the computer network, and at least one of the plurality of bridge nodes operating as an egress bridge node through which the frames are transmitted out of the computer network, the method comprising the steps of:
   receiving, by one of the plurality of bridge nodes connected to the egress bridge node by a single hop, a frame that has a shortest path bridging header that includes an ingress bridge nickname and an egress bridge nickname for transmission to a destination node, wherein the destination node is connected to the network through the egress bridge node;
   determining, by the bridge node, that the frame traverses the egress bridge node on the next network hop;
   replacing, by the bridge node in response to the determination, the shortest path bridging header of the frame with an ingress bridge identifier and an egress bridge identifier, wherein the frame including the ingress bridge identifier and the egress bridge identifier does not have MAC-in-MAC encapsulation; and
   routing, by the bridge node, the frame including the ingress bridge identifier and the egress bridge identifier to the egress bridge node based on the ingress bridge identifier and the egress bridge identifier included in the frame.

11. The method of claim 10 wherein the step of replacing, by the bridge node in response to the determination, the shortest path bridging header with an ingress bridge identifier and an egress bridge identifier further comprises the step of adding a vender header to the frame that includes the ingress bridge identifier and the egress bridge identifier.

12. The method of claim 10 wherein the bridge node supports a Transparent Interconnection of Lots of Links ('TRILL') protocol and the shortest path bridging header conforms to the TRILL protocol.

13. The method of claim 10 wherein hardware of the ingress bridge node and hardware of the egress bridge node are incapable of supporting MAC-in-MAC encapsulation.

14. An apparatus for routing frames in a computer network that uses media access control (MAC)-in-MAC encapsulation using bridge identifiers, the computer network including a plurality of bridge nodes, at least one of the plurality of bridge nodes operating as an ingress bridge node through which the frames are received into the computer network, and at least one of the plurality of bridge nodes operating as an egress bridge node through which the frames are transmitted out of the computer network, the apparatus comprising:

a processor configured to:

receive, by one of the plurality of bridge nodes from the ingress bridge node, a frame including an ingress bridge identifier and an egress bridge identifier that does not have MAC-in-MAC encapsulation for transmission to a destination node, wherein the destination node is connected to the network through the egress bridge node, replace, by the bridge node, the ingress bridge identifier and the egress bridge identifier of the frame with a shortest path bridging header, and route, by the bridge node, the frame including the shortest path bridging header along a path toward the egress bridge node based on the shortest path bridging header included in the frame.

15. The apparatus of claim 14 wherein the frame received by the bridge node from the ingress bridge node further comprises a vender header specified by a vender of the ingress bridge node, the vender header including the ingress bridge identifier and the egress bridge identifier.

16. The apparatus of claim 14 wherein the shortest path bridging header conforms to a shortest path bridging protocol, and wherein the shortest path bridging header includes an ingress bridge nickname and an egress bridge nickname based on the ingress bridge identifier and the egress bridge identifier, the ingress bridge nickname allocated to the ingress bridge node according to a predetermined protocol, and the egress bridge nickname allocated to the egress bridge node according to the predetermined protocol.

17. The apparatus of claim 16 wherein the processor is configured to:

identify, based on the egress bridge nickname included in the shortest path bridging header, a MAC address for a next bridge in the network that is on the path from the bridge node to the egress bridge node;

add the MAC address for the next bridge node to the frame; and route the frame to the next bridge node based on the MAC address.

18. The apparatus of claim 14 wherein hardware of the ingress bridge node and hardware of the egress bridge node is incapable of MAC-in-MAC encapsulation.

19. An apparatus for routing frames in a computer network that uses media access control (MAC)-in-MAC encapsulation using bridge identifiers, the computer network including a plurality of bridge nodes, at least one of the plurality of bridge nodes operating as an ingress bridge node through which the frames are received into the computer network, and at least one of the plurality of bridge nodes operating as an egress bridge node through which the frames are transmitted out of the computer network, the apparatus comprising:

a processor configured to:

receive, by one of the plurality of bridge nodes connected to the egress bridge node by a single hop, a frame that has a shortest path bridging header that includes an ingress bridge nickname and an egress bridge nickname for transmission to a destination node, wherein the destination node is connected to the network through the egress bridge node, determine, by the bridge node, that the frame traverses the egress bridge node on the next network hop, replace, by the bridge node in response to the determination, the shortest path bridging header with an ingress bridge identifier and an egress bridge identifier, wherein the frame including the ingress bridge identifier and the egress bridge identifier does not have MAC-in-MAC encapsulation, and route, by the bridge node, the frame including the ingress bridge identifier and the egress bridge identifier to the egress bridge node based on the ingress bridge identifier and the egress bridge identifier included in the frame.

20. The apparatus of claim 19 wherein hardware of the ingress bridge node and hardware of the egress bridge node are incapable of MAC-in-MAC encapsulation.

21. A non-transitory computer-readable medium for routing frames in a computer network that uses media access control (MAC)-in-MAC encapsulation using bridge identifiers, the computer network including a plurality of bridge nodes, at least one of the plurality of bridge nodes operating as an ingress bridge node through which the frames are received into the computer network, and at least one of the plurality of bridge nodes operating as an egress bridge node through which the frames are transmitted out of the computer network, the computer-readable medium encoded with instructions that when executed cause a processor to perform the steps of:

receiving, by one of the plurality of bridge nodes from the ingress bridge node, a frame including an ingress bridge identifier and an egress bridge identifier that does not have MAC-in-MAC encapsulation for transmission to a destination node, wherein the destination node is connected to the network through the egress bridge node;

replacing, by the bridge node, the ingress bridge identifier and the egress bridge identifier of the frame with a shortest path bridging header; and routing, by the bridge node, the frame including the shortest path bridging header along a path toward the egress bridge node based on the shortest path bridging header included in the frame.

22. The non-transitory computer-readable medium of claim 21 wherein the shortest path bridging header conforms to a shortest path bridging protocol, and wherein the shortest path bridging header includes an ingress bridge nickname and an egress bridge nickname based on the ingress bridge identifier and the egress bridge identifier, the ingress bridge nickname allocated to the ingress bridge node according to a predetermined protocol, and the egress bridge nickname allocated to the egress bridge node according to the predetermined protocol.

23. The non-transitory computer-readable medium of claim 22 wherein the instructions cause the processor to perform the steps of:

identifying, based on the egress bridge nickname included in the shortest path bridging header, a MAC address for a next bridge in the network that is on the path from the bridge node to the egress bridge node adding the MAC address for the next bridge node to the frame; and routing the frame to the next bridge node based on the MAC address.

24. The non-transitory computer-readable medium of claim 23 wherein hardware of the ingress bridge node and hardware of the egress bridge node are incapable of MAC-in-MAC encapsulation.

25. A non-transitory computer-readable medium for routing frames in a computer network that uses media access control (MAC)-in-MAC encapsulation using bridge identifiers, the computer network including a plurality of bridge nodes, at least one of the plurality of bridge nodes operating as an ingress bridge node through which the frames are received into the computer network, and at least one of the plurality of bridge nodes operating as an egress bridge node through which the frames are transmitted out of the computer network, the computer-readable medium encoded with instructions that when executed cause a processor to perform the steps of:

receiving, by one of the plurality of bridge nodes connected to the egress bridge node by a single hop, a frame that has a shortest path bridging header that includes an ingress bridge nickname and an egress bridge nickname for transmission to a destination node, wherein the destination node is connected to the network through the egress bridge node;

determining, by the bridge node, that the frame traverses the egress bridge node on the next network hop;

replacing, by the bridge node in response to the determination, the shortest path bridging header with an ingress bridge identifier and an egress bridge identifier, wherein the frame including the ingress bridge identifier and the egress bridge identifier does not have MAC-in-MAC encapsulation; and routing, by the bridge node, the frame including the ingress bridge identifier and the egress bridge identifier to the egress bridge node based on the ingress bridge identifier and the egress bridge identifier included in the frame.

26. The non-transitory computer-readable medium of claim 25 wherein hardware of the ingress bridge node and hardware of the egress bridge node are incapable of MAC-in-MAC encapsulation.

\* \* \* \* \*